US 8,462,109 B2

(12) United States Patent
Nasiri et al.

(10) Patent No.: US 8,462,109 B2
(45) Date of Patent: *Jun. 11, 2013

(54) CONTROLLING AND ACCESSING CONTENT USING MOTION PROCESSING ON MOBILE DEVICES

(75) Inventors: Steven S. Nasiri, Saratoga, CA (US); David Sachs, Sunnyvale, CA (US)

(73) Assignee: Invensense, Inc., Sunnyvale, CA (US)

( * ) Notice: Subject to any disclaimer, the term of this patent is extended or adjusted under 35 U.S.C. 154(b) by 558 days.
This patent is subject to a terminal disclaimer.

(21) Appl. No.: 12/485,823

(22) Filed: Jun. 16, 2009

(65) Prior Publication Data

US 2009/0303204 A1  Dec. 10, 2009

Related U.S. Application Data

(63) Continuation-in-part of application No. 11/649,936, filed on Jan. 5, 2007, now Pat. No. 7,796,872, and a continuation-in-part of application No. 11/766,776, filed on Jun. 21, 2007, now Pat. No. 8,047,075, and a continuation-in-part of application No. 11/774,488, filed on Jul. 6, 2007, and a continuation-in-part of application No. 11/953,762, filed on Dec. 10, 2007, now Pat. No. 7,934,423, and a continuation-in-part of application No. 12/026,493, filed on Feb. 5, 2008, now Pat. No. 7,827,502, and a continuation-in-part of application No. 12/106,921, filed on Apr. 21, 2008, and a continuation-in-part of application No. 12/117,264, filed on May 8, 2008, and a continuation-in-part of application No. 12/210,045, filed on Sep. 12, 2008, and a continuation-in-part of application No. 12/236,757, filed on Sep. 24, 2008, and a continuation-in-part of application No. 12/252,322, filed on Oct. 15, 2008, and a continuation-in-part of application No. 12/398,156, filed on Mar. 4, 2009, now abandoned.

(60) Provisional application No. 61/109,356, filed on Oct. 29, 2008, provisional application No. 61/022,143, filed on Jan. 18, 2008.

(51) Int. Cl.
*G06F 3/033* (2006.01)
*G09G 5/08* (2006.01)

(52) U.S. Cl.
USPC ........................................................ 345/158

(58) Field of Classification Search
USPC ........................................................ 345/158
See application file for complete search history.

(56) References Cited

U.S. PATENT DOCUMENTS 4,303,978 A  12/1981  Shaw et al.
4,510,802 A  4/1985  Peters (Continued)

FOREIGN PATENT DOCUMENTS

EP  0429391  8/1995
GB  2428802  2/2007

(Continued)

OTHER PUBLICATIONS

Oboe, R., Lasalandra, E., White, M. M., "MEMS-based Accelerometers and their Application to Vibration Suppression in Hard Disk Drives." MEMS/NEMS Handbook Techniques and Applications, vol. 4, Springer 2006, pp. 1-29, see pp. 7-22.

(Continued)

*Primary Examiner* — Clayton E Laballe
*Assistant Examiner* — Linda B Smith
(74) *Attorney, Agent, or Firm* — Sawyer Law Group, P.C.

(57) ABSTRACT

Various embodiments provide systems and methods capable of facilitating interaction with handheld electronics devices based on sensing rotational rate around at least three axes and linear acceleration along at least three axes. In one aspect, a handheld electronic device includes a subsystem providing display capability, a set of motion sensors sensing rotational rate around at least three axes and linear acceleration along at least three axes, and a subsystem which, based on motion data derived from at least one of the motion sensors, is capable of facilitating interaction with the device.

12 Claims, 9 Drawing Sheets

U.S. PATENT DOCUMENTS

| | | | |
|---|---|---|---|
| 4,601,206 A | 7/1986 | Watson | |
| 4,736,629 A | 4/1988 | Cole | |
| 4,783,742 A | 11/1988 | Peters | |
| 4,841,773 A | 6/1989 | Stewart | |
| 5,251,484 A | 10/1993 | Mastache | |
| 5,313,835 A * | 5/1994 | Dunn | 73/514.15 |
| 5,349,858 A | 9/1994 | Yagi et al. | |
| 5,359,893 A | 11/1994 | Dunn | |
| 5,367,631 A | 11/1994 | Levy | |
| 5,415,040 A | 5/1995 | Nottmeyer | |
| 5,433,110 A | 7/1995 | Gertz et al. | |
| 5,440,326 A | 8/1995 | Quinn | |
| 5,444,639 A | 8/1995 | White | |
| 5,511,419 A | 4/1996 | Dunn | |
| 5,541,860 A | 7/1996 | Takei et al. | |
| 5,574,221 A | 11/1996 | Park et al. | |
| 5,629,988 A | 5/1997 | Burt et al. | |
| 5,635,638 A | 6/1997 | Geen | |
| 5,635,639 A | 6/1997 | Greiff et al. | |
| 5,698,784 A | 12/1997 | Hotelling | |
| 5,703,293 A | 12/1997 | Zabler et al. | |
| 5,703,623 A | 12/1997 | Hall et al. | |
| 5,734,373 A | 3/1998 | Rosenberg et al. | |
| 5,780,740 A | 7/1998 | Lee et al. | |
| 5,825,350 A | 10/1998 | Case, Jr. | |
| 5,895,850 A | 4/1999 | Buestgens | |
| 5,898,421 A | 4/1999 | Quinn | |
| 5,955,668 A | 9/1999 | Hsu et al. | |
| 5,992,233 A | 11/1999 | Clark | |
| 5,996,409 A | 12/1999 | Funk et al. | |
| 6,067,858 A | 5/2000 | Clark et al. | |
| 6,122,961 A | 9/2000 | Geen et al. | |
| 6,134,961 A | 10/2000 | Touge et al. | |
| 6,158,280 A | 12/2000 | Nonomura | |
| 6,168,965 B1 | 1/2001 | Malinovich et al. | |
| 6,189,381 B1 | 2/2001 | Huang et al. | |
| 6,192,756 B1 | 2/2001 | Kikuchi et al. | |
| 6,230,564 B1 | 5/2001 | Matsunaga et al. | |
| 6,250,156 B1 | 6/2001 | Seshia et al. | |
| 6,250,157 B1 | 6/2001 | Touge | |
| 6,269,254 B1 | 7/2001 | Mathis | |
| 6,279,043 B1 | 8/2001 | Hayward et al. | |
| 6,292,170 B1 | 9/2001 | Chang et al. | |
| 6,343,349 B1 | 1/2002 | Braun et al. | |
| 6,370,937 B2 | 4/2002 | Hsu | |
| 6,374,255 B1 | 4/2002 | Peurach et al. | |
| 6,386,033 B1 | 5/2002 | Negoro | |
| 6,391,673 B1 | 5/2002 | Ha et al. | |
| 6,393,914 B1 | 5/2002 | Zarabadi et al. | |
| 6,424,356 B2 | 7/2002 | Chang et al. | |
| 6,429,895 B1 | 8/2002 | Onuki | |
| 6,430,998 B2 | 8/2002 | Kawai et al. | |
| 6,480,320 B2 | 11/2002 | Nasiri | |
| 6,481,283 B1 | 11/2002 | Cardarelli | |
| 6,481,284 B2 | 11/2002 | Geen et al. | |
| 6,481,285 B1 | 11/2002 | Shkel et al. | |
| 6,487,369 B1 | 11/2002 | Sato | |
| 6,487,908 B2 | 12/2002 | Geen et al. | |
| 6,494,096 B2 | 12/2002 | Sakai et al. | |
| 6,508,122 B1 | 1/2003 | McCall et al. | |
| 6,508,125 B2 | 1/2003 | Otani | |
| 6,513,380 B2 | 2/2003 | Reeds, III et al. | |
| 6,520,017 B1 | 2/2003 | Schoefthaler et al. | |
| 6,533,947 B2 | 3/2003 | Nasiri et al. | |
| 6,573,883 B1 | 6/2003 | Bartlett | |
| 6,636,521 B1 | 10/2003 | Guillianelli | |
| 6,646,289 B1 | 11/2003 | Badehi | |
| 6,647,352 B1 | 11/2003 | Horton | |
| 6,668,614 B2 | 12/2003 | Itakura | |
| 6,720,994 B1 | 4/2004 | Grottodden et al. | |
| 6,725,719 B2 | 4/2004 | Cardarelli | |
| 6,729,176 B2 * | 5/2004 | Begin | 73/1.38 |
| 6,758,093 B2 | 7/2004 | Tang et al. | |
| 6,794,272 B2 | 9/2004 | Turner et al. | |
| 6,796,178 B2 | 9/2004 | Jeong et al. | |
| 6,823,733 B2 | 11/2004 | Ichinose | |
| 6,834,249 B2 | 12/2004 | Orchard | |
| 6,843,127 B1 | 1/2005 | Chiou | |
| 6,845,669 B2 | 1/2005 | Acar et al. | |
| 6,848,304 B2 | 2/2005 | Geen | |
| 6,859,751 B2 | 2/2005 | Cardarelli | |
| 6,860,150 B2 | 3/2005 | Cho | |
| 6,892,575 B2 | 5/2005 | Nasiri et al. | |
| 6,915,693 B2 | 7/2005 | Kim et al. | |
| 6,918,297 B2 | 7/2005 | MacGugan | |
| 6,918,298 B2 | 7/2005 | Park | |
| 6,938,484 B2 | 9/2005 | Najafi et al. | |
| 6,939,473 B2 | 9/2005 | Nasiri et al. | |
| 6,952,965 B2 | 10/2005 | Kang et al. | |
| 6,955,086 B2 | 10/2005 | Yoshikawa et al. | |
| 6,963,345 B2 | 11/2005 | Boyd et al. | |
| 6,972,480 B2 | 12/2005 | Zilber et al. | |
| 6,981,416 B2 | 1/2006 | Chen et al. | |
| 7,004,025 B2 | 2/2006 | Tamura | |
| 7,028,546 B2 | 4/2006 | Hoshal | |
| 7,028,547 B2 | 4/2006 | Shiratori et al. | |
| 7,036,372 B2 | 5/2006 | Chojnacki et al. | |
| 7,040,163 B2 | 5/2006 | Shcheglov et al. | |
| 7,040,922 B2 | 5/2006 | Harney et al. | |
| 7,043,985 B2 | 5/2006 | Ayazi et al. | |
| 7,057,645 B1 | 6/2006 | Hara et al. | |
| 7,077,007 B2 | 7/2006 | Rich et al. | |
| 7,093,487 B2 | 8/2006 | Mochida | |
| 7,104,129 B2 | 9/2006 | Nasiri et al. | |
| 7,121,141 B2 | 10/2006 | McNeil | |
| 7,154,477 B1 | 12/2006 | Hotelling et al. | |
| 7,155,975 B2 | 1/2007 | Mitani et al. | |
| 7,158,118 B2 | 1/2007 | Liberty | |
| 7,159,442 B1 | 1/2007 | Jean | |
| 7,168,317 B2 | 1/2007 | Chen | |
| 7,180,500 B2 | 2/2007 | Marvit et al. | |
| 7,196,404 B2 | 3/2007 | Schirmer et al. | |
| 7,210,351 B2 | 5/2007 | Lo et al. | |
| 7,222,533 B2 | 5/2007 | Mao et al. | |
| 7,236,156 B2 | 6/2007 | Liberty et al. | |
| 7,237,437 B1 | 7/2007 | Fedora | |
| 7,239,301 B2 | 7/2007 | Liberty et al. | |
| 7,240,552 B2 | 7/2007 | Acar et al. | |
| 7,243,561 B2 | 7/2007 | Ishigami et al. | |
| 7,247,246 B2 | 7/2007 | Nasiri et al. | |
| 7,250,112 B2 | 7/2007 | Nasiri et al. | |
| 7,258,008 B2 | 8/2007 | Durante et al. | |
| 7,258,011 B2 | 8/2007 | Nasiri et al. | |
| 7,260,789 B2 | 8/2007 | Hunleth et al. | |
| 7,262,760 B2 | 8/2007 | Liberty | |
| 7,284,430 B2 | 10/2007 | Acar et al. | |
| 7,289,898 B2 | 10/2007 | Hong et al. | |
| 7,290,435 B2 | 11/2007 | Seeger et al. | |
| 7,299,695 B2 | 11/2007 | Tanaka et al. | |
| 7,325,454 B2 | 2/2008 | Saito et al. | |
| 7,331,212 B2 | 2/2008 | Manlove et al. | |
| 7,333,087 B2 | 2/2008 | Soh et al. | |
| 7,352,567 B2 | 4/2008 | Hotelling et al. | |
| 7,377,167 B2 | 5/2008 | Acar et al. | |
| 7,386,806 B2 | 6/2008 | Wroblewski | |
| 7,395,181 B2 | 7/2008 | Foxlin | |
| 7,414,611 B2 | 8/2008 | Liberty | |
| 7,424,213 B2 | 9/2008 | Imada | |
| 7,437,931 B2 | 10/2008 | Dwyer et al. | |
| 7,442,570 B2 | 10/2008 | Nasiri et al. | |
| 7,454,971 B2 | 11/2008 | Blomqvist | |
| 7,458,263 B2 | 12/2008 | Nasiri et al. | |
| 7,508,384 B2 | 3/2009 | Zhang et al. | |
| 7,522,947 B2 | 4/2009 | Tsuda | |
| 7,533,569 B2 | 5/2009 | Sheynblat | |
| 7,549,335 B2 | 6/2009 | Inoue et al. | |
| 7,552,636 B2 | 6/2009 | Datskos | |
| 7,617,728 B2 | 11/2009 | Cardarelli | |
| 7,621,183 B2 | 11/2009 | Seeger et al. | |
| 7,637,155 B2 | 12/2009 | Delevoye | |
| 7,677,099 B2 | 3/2010 | Nasiri et al. | |
| 7,677,100 B2 | 3/2010 | Konaka | |
| 7,688,306 B2 | 3/2010 | Wehrenberg et al. | |
| 7,732,302 B2 * | 6/2010 | Yazdi | 438/456 |
| 7,765,869 B2 | 8/2010 | Sung et al. | |
| 7,779,689 B2 | 8/2010 | Li et al. | |
| 7,783,392 B2 | 8/2010 | Oikawa | |

| | | |
|---|---|---|
| 7,784,344 B2 | 8/2010 | Pavelescu et al. |
| 7,795,074 B2 | 9/2010 | Shao et al. |
| 7,814,791 B2 | 10/2010 | Andersson et al. |
| 7,814,792 B2 | 10/2010 | Tateyama et al. |
| 7,886,597 B2 | 2/2011 | Uchiyama et al. |
| 7,907,838 B2 | 3/2011 | Nasiri et al. |
| 7,970,586 B1 | 6/2011 | Kahn et al. |
| 8,018,435 B2 * | 9/2011 | Orchard et al. ............... 345/158 |
| 8,020,441 B2 | 9/2011 | Seeger |
| 8,141,424 B2 | 3/2012 | Seeger et al. |
| 8,230,740 B2 | 7/2012 | Katsuki et al. |
| 2002/0027296 A1 | 3/2002 | Badehi |
| 2002/0189351 A1 | 12/2002 | Reeds et al. |
| 2003/0159511 A1 | 8/2003 | Zarabadi et al. |
| 2003/0209789 A1 | 11/2003 | Hanson et al. |
| 2004/0016995 A1 | 1/2004 | Kuo et al. |
| 2004/0066981 A1 | 4/2004 | Li et al. |
| 2004/0160525 A1 | 8/2004 | Kingetsu et al. |
| 2004/0179108 A1 | 9/2004 | Sorek et al. |
| 2005/0066728 A1 | 3/2005 | Chojnacki |
| 2005/0110778 A1 | 5/2005 | Ben Ayed |
| 2005/0170656 A1 | 8/2005 | Nasiri et al. |
| 2005/0212751 A1 * | 9/2005 | Marvit et al. ............... 345/156 |
| 2006/0017837 A1 | 1/2006 | Sorek et al. |
| 2006/0032308 A1 | 2/2006 | Acar et al. |
| 2006/0033823 A1 | 2/2006 | Okamura |
| 2006/0061545 A1 | 3/2006 | Hughes et al. |
| 2006/0074558 A1 | 4/2006 | Williamson et al. |
| 2006/0115297 A1 | 6/2006 | Nakamaru |
| 2006/0119710 A1 | 6/2006 | Ben-Ezra et al. |
| 2006/0139327 A1 | 6/2006 | Dawson et al. |
| 2006/0164382 A1 | 7/2006 | Kulas et al. |
| 2006/0164385 A1 | 7/2006 | Smith et al. |
| 2006/0185502 A1 | 8/2006 | Nishitani et al. |
| 2006/0187308 A1 | 8/2006 | Lim et al. |
| 2006/0208326 A1 | 9/2006 | Nasiri et al. |
| 2006/0251410 A1 | 11/2006 | Trutna, Jr. |
| 2006/0256074 A1 | 11/2006 | Krum et al. |
| 2007/0035630 A1 | 2/2007 | Lindenstruth et al. |
| 2007/0055468 A1 | 3/2007 | Pylvanainen |
| 2007/0063985 A1 | 3/2007 | Yamazaki et al. |
| 2007/0113207 A1 | 5/2007 | Gritton |
| 2007/0123282 A1 | 5/2007 | Levinson |
| 2007/0146325 A1 | 6/2007 | Poston et al. |
| 2007/0167199 A1 | 7/2007 | Kang |
| 2007/0176898 A1 | 8/2007 | Suh |
| 2007/0219744 A1 | 9/2007 | Kolen |
| 2007/0239399 A1 | 10/2007 | Sheynblat et al. |
| 2007/0277112 A1 * | 11/2007 | Rossler et al. ............... 715/764 |
| 2008/0009348 A1 | 1/2008 | Zaleweski et al. |
| 2008/0088602 A1 | 4/2008 | Hotelling |
| 2008/0098315 A1 | 4/2008 | Chou et al. |
| 2008/0134784 A1 | 6/2008 | Jeng et al. |
| 2008/0158154 A1 | 7/2008 | Liberty et al. |
| 2008/0204566 A1 | 8/2008 | Yamazaki et al. |
| 2008/0314147 A1 | 12/2008 | Nasiri et al. |
| 2009/0005975 A1 | 1/2009 | Forstall et al. |
| 2009/0005986 A1 | 1/2009 | Soehren |
| 2009/0007661 A1 * | 1/2009 | Nasiri et al. ............... 73/504.03 |
| 2009/0043504 A1 | 2/2009 | Bandyopadhyay et al. |
| 2009/0088204 A1 | 4/2009 | Culbert et al. |
| 2009/0282917 A1 * | 11/2009 | Acar ............... 73/514.02 |
| 2009/0326851 A1 | 12/2009 | Tanenhaus |
| 2010/0013814 A1 | 1/2010 | Jarczyk |
| 2011/0101474 A1 * | 5/2011 | Funk ............... 257/415 |

FOREIGN PATENT DOCUMENTS

| | | |
|---|---|---|
| JP | 06-291725 | 10/1994 |
| JP | 2001-174283 | 6/2001 |
| JP | 2004-517306 | 6/2004 |
| JP | 2005-233701 | 9/2005 |
| JP | 2005-283428 | 10/2005 |
| JP | 2005-345473 | 12/2005 |
| JP | 2006-275660 | 10/2006 |
| JP | 2007-173641 | 7/2007 |
| JP | 2008-003182 | 1/2008 |
| JP | 20087-003182 | 1/2008 |
| JP | 2008-520985 | 6/2008 |
| WO | WO 2006/043890 | 4/2006 |
| WO | WO 2008/026357 | 3/2008 |
| WO | W02009016607 | 2/2009 |

OTHER PUBLICATIONS

Singh, Amit, "The Apple Motion Sensor as a Human Interface Device," www.kernelthread.com, 1994-2006.

Oboe, R., Lasalandra, E., White, M. M. MEMS-based Accelerometers and their Application to Vibration Suppression in Hard Disk Drives. MEMS/NEMS Handbook Techniques and Applications vol. 4, Springer 2006, pp. 1-29 see pp. 7-22.

Cho, et al., Dynamics of Tilt-based Browsing on Mobile Devices. CHI 2007, Apr. 28-May 3, 2007, San Jose, California, USA., pp. 1947-1952.

Roberto Oboe, et al., "MEMS-based Accelerometers and their Application to Vibration Suppression in Hard Dish Drives," MEMS/NEMS Handbook Techniques and Application, vol. 4, Springer 2006, pp. 7-22, Dec. 31, 2006.

Liu Jun, et al., "Study on Single Chip Integration Accelerometer Gyroscope," Journal of Test and Measurement Technology, vol. 17, Issue 2, pp. 157-158, Dec. 31, 2003.

* cited by examiner

CONTROLLING AND ACCESSING CONTENT USING MOTION PROCESSING ON MOBILE DEVICES

CROSS REFERENCE TO RELATED APPLICATIONS

This application claims the benefit of U.S. Provisional Application No. 61/109,356, filed Oct. 29, 2008, entitled, "Methods of Controlling Content Using Motion Processing on Mobile Devices";

This application is a continuation-in-part of U.S. patent application Ser. No. 11/649,936, filed Jan. 5, 2007, entitled, "Method and Apparatus for Producing a Sharp Image from a Handheld Device Containing a Gyroscope,"

This application is a continuation-in-part of U.S. patent application Ser. No. 11/766,776, filed Jun. 21, 2007, entitled, "Vertically Integrated 3-axis MEMS Accelerometer with Electronics";

This application is a continuation-in-part of U.S. patent application Ser. No. 11/774,488, filed Jul. 6, 2007, entitled, "Integrated Motion Processing Unit (MPU) with MEMS Inertial Sensing and Embedded Digital Electronics";

This application is a continuation-in-part of U.S. patent application Ser. No. 11/953,762, filed Dec. 10, 2007, entitled, "Vertically Integrated 3-axis Rotational MEMS Accelerometers with Electronics";

This application is a continuation-in-part of U.S. patent application Ser. No. 12/026,493, filed Feb. 5, 2008, entitled, "Dual Mode Sensing for Vibratory Gyroscope";

This application is a continuation-in-part of U.S. patent application Ser. No. 12/106,921, filed Apr. 21, 2008, entitled, "Interfacing Application Programs and Motion Sensors of a Device," which claims the benefit of U.S. Provisional Application No. 61/022,143, filed Jan. 18, 2008, entitled, "Motion Sensing Application Interface";

This application is a continuation-in-part of U.S. patent application Ser. No. 12/117,264, filed May 8, 2008, entitled, "Wafer Scale Chip Packaging of Vertically Integrated MEMS Sensors with Electronics";

This application is a continuation-in-part of U.S. patent application Ser. No. 12/210,045, filed Sep. 12, 2008, entitled, "Low Inertia Frame for Detecting Coriolis Acceleration";

This application is a continuation-in-part of U.S. patent application Ser. No. 12/236,757, filed Sep. 24, 2008, entitled, "Integrated Multiaxis Motion Sensor";

This application is a continuation-in-part of U.S. patent application Ser. No. 12/252,322, filed Oct. 15, 2008, entitled, "Mobile Devices with Motion Gesture Recognition," which claims the benefit of U.S. Provisional Application No. 61/022,143, filed Jan. 18, 2008, entitled, "Motion Sensing Application Interface";

This application is a continuation-in-part of U.S. patent application Ser. No. 12/398,156, filed Mar. 4, 2009, entitled, "Controlling And Accessing Content Using Motion Processing On Mobile Devices;"

all of which are incorporated herein by reference in their entireties.

BACKGROUND OF THE INVENTION

Handheld electronic devices are used in a wide variety of applications and environments. The ubiquity of such devices as mobile phones, digital still cameras and video cameras, handheld music and media players, portable video game devices and controllers, mobile internet devices (MIDs), personal navigation devices (PNDs), and other handheld devices speaks the popularity and desire for these types of devices. However, controlling the multitude of functions of a handheld device can often be awkward or clumsy, due to the small size of the devices. For example, handheld devices with a button input or touch screen typically require two hands of the user to be effectively used, as well as the close attention of the user when operating the device.

Motion sensors, such as inertial sensors like accelerometers or gyroscopes, can be used in handheld electronic devices. Accelerometers can be used for measuring linear acceleration and gyroscopes can be used for measuring angular velocity of a moved handheld electronic device. The markets for motion sensors include mobile phones, video game controllers, personal digital assistants (PDAs), mobile internet devices (MIDs), personal navigational devices (PNDs), digital still cameras, digital video cameras, remote controls, and many more. For example, mobile phones may use accelerometers to detect the tilt of the device in space, which allows a video picture to be displayed in an orientation corresponding to the tilt. Video game console controllers may use accelerometers to detect motion of the hand controller that is used to provide input to a game. Picture and video stabilization is an important feature in even low- or mid-end digital cameras, where lens or image sensors are shifted to compensate for hand jittering measured by a gyroscope. Global positioning system (GPS) and location based service (LBS) applications rely on determining an accurate location of the device, and motion sensors are often needed when a GPS signal is attenuated or unavailable, or to enhance the accuracy of GPS location finding.

Many existing handheld electronic devices tend to use only the very basic motion sensors, such as an accelerometer with "peak detection" or steady state measurements. For example, current mobile phones use an accelerometer to determine tilting of the device, which can be determined using a steady state gravity measurement. Such simple determination may not be acceptable for more sophisticated applications which would require gyroscopes or other applications having precise timing capabilities. Without a gyroscope included in the device, the tilting and acceleration of the device is not sensed reliably. Also, motion of the device is not always linear or parallel to the ground, and many current devices will often not sense other types of motion accurately. Therefore, existing devices are restricted in their motion sensing ability, and limited in how they use motion sensing to enable functions and control of the device.

A variety of devices, systems and applications (which may or may not be relevant to inventions herein) have sought to take advantage of motion sensor detection, including gaming devices, mobile telephones, and devices with military applications. A number of industry segments have evolved to design and manufacture such devices, systems and applications, from component designers to end-user device manufacturers and software developers. The state of the current art, however, is still limited by the accuracy of motion sensing that can be achieved via existing motion sensors integrated in single devices and known implementations are not adequate to serve as a platform for development of a handheld device with integrated motion sensors, where the device facilitates personal communications and provides access to visual content made available by or through the device.

For example, sophisticated Inertial Measurement Unit (IMU) devices have been designed to include motion sensing along three gyroscopic axes, three accelerometer axes and three compass axes. Generally, these devices have been relatively-large devices, not fit for handheld applications directed at end users, and instead deployed in industrial or military settings. For example, IMUs have been incorporated in satellites orbiting the Earth, which need to maintain particular orientations with antennas and other communication systems facing the Earth.

Other devices intended for end-user applications attempt to reduce form factors while incorporating motion sensors. For example, some devices may incorporate motion sensing along three accelerometer axes (in addition to detection of an optical source placed close to a display) to facilitate user interaction with video games. One improvement released recently is an attachment for the Nintendo® Wii® Remote™ game remote control and denoted MotionPlus, which is a distinct add-on device that plugs into the Wii Remote, and adds a set of sensors capable of detecting motion along three gyroscope axes (these sensors are manufactured by InvenSense, the assignee of this patent). The MotionPlus, combined with the Wii Remote, produces a compounded device that can sense motion along a combined three gyroscope axes and three accelerometer axes.

Details regarding military devices and applications are generally not known in the public domain, and this also applies to motion sensing technology. It is reasonable to assume at this point (although this is not by any means actually known to be true) that state-of-the-art personal head-worn visual displays used in military applications (e.g., sophisticated glasses or goggles that include an electronic display, possibly integrated as part of a helmet) may include motion sensors capable of detecting motion along three gyroscope axes and three accelerometer axes. It is unlikely, however, that in such an application, if it existed, any significant integration of gyroscopes and accelerometers has been achieved. Further, many interactions with applications on a hand-held device via motion of the device, such as icon selection, menu selection or list scrolling, would be impractical or impossible via such a military head-worn visual display (e.g., shaking a phone to activate a feature is feasible, but shaking the head to achieve the same result on a head-worn visual display is not). Consequently, such military devices do not serve as good platforms for developing a handheld device with integrated motion sensors that facilitates personal communications and provides access to visual content made available by or through the device. No company has attempted to modify such military systems into such a communication handheld device, and indeed such a modification would be inappropriate, counterintuitive and not economically feasible.

Additional devices and components have been introduced on the market providing various degrees of integration of accelerometers and sensors, but none of them provide 3-axis gyroscope and 3-axis accelerometer motion sensors for sufficient accuracy and serve as adequate building blocks for next generation handheld mobile devices. Examples of such devices and components include motion sensing components marketed by AKM Corporation (which incorporate three accelerometers and three compass sensors), wireless mice, pointer devices, and media remote controllers marketed by Movea Corporation and/or Gyration Corporation (which appear to include three accelerometers and two gyroscopes), various mobile phones (which currently incorporate three accelerometers), portable video game add-on attachments, photo and video cameras (which may incorporate up to two gyroscopes for image stabilization purposes, and possibly also one-to-three separate accelerometers if they also incorporate hard drives), and navigation systems (which may incorporate up to two gyroscopes and three accelerometers). The number of accelerometers and gyroscopes cited above are estimated based on currently available public information.

Some devices having accelerometers and gyroscopes may separate the set of accelerometers and the set of gyroscopes into two distinct units. The two sets of sensors may be disposed relatively far from each other, which introduces spatial separation between the two sets of sensors, making unified motion detection more difficult and less accurate. Furthermore, the two sets of sensors may rely on communication via the interface between the two distinct units, which can make synchronization of the data from the accelerometers and gyroscopes more difficult and inaccurate.

Some devices also do not integrate a display subsystem to permit direct interaction with games (whether an actual display or logic capable of substantially producing an image to be displayed on an external device). Consequently, such devices do not serve as a good platform for developing a handheld device with integrated motion sensors that facilitates personal communications and provides visual access to graphical data, such as a mobile phone with an integrated or external display.

United States patent application US20090066637A1 discloses a handheld device that incorporates "various gyroscopes and accelerometers" and displays a map on an integrated screen. Motion of the device is used to modify the field of view of the map. This navigation-assistive device does not disclose any specific integration of accelerometers and gyroscopes or any specific personal communication functionality. Further, the device of US20090066637A1 is not adapted or intended to facilitate user interaction with content beyond a map. Consequently, US20090066637A1 does not disclose, and does not suggest any desirability or avenue for the development of, a handheld device that incorporates a set of closely-integrated accelerometer and gyroscope motion sensors, where the device facilitates personal communications and provides access to a broad range of visual content made available by or through the device.

United States patent application US20080034321A1 discloses a handheld device that incorporates motion sensors and permits a user to control certain content displayed on a screen integrated in the device, such as a video stream. This device incorporates an accelerometer implemented in certain specific electronic circuit configuration (see FIGS. 10 and 11). US20080034321A1 appears to contemplate up to two additional accelerometers, for a total of three accelerometers (see paragraph [0097]), and the introduction of a gyroscope (either as a replacement for an accelerometer or as a sensor that is somehow combined with an accelerometer—see paragraph [0099]). US20080034321A1 does not disclose any architectural details of how a gyroscope could be introduced into the handheld device disclosed in that application, and does not contemplate any close integration between one or more accelerometers and a gyroscope. Consequently, US20080034321A1 does not disclose, and does not suggest any desirability or avenue for the development of, a handheld device that incorporates a set of closely-integrated accelerometer and gyroscope motion sensors, where the device facilitates personal communications and provides access to a broad range of visual content made available by or through the device.

United States patent application US20060279542A1 discloses a handheld device that permits a user to manipulate a geographic map displayed on an integrated screen via movement of the device. US20060279542A1 suggests additional content that could be manipulated by the user, such as other types of maps and pages of documents. According to US20060279542A1, the device may incorporate up to three accelerometers, or possibly "a gyroscope and an accelerometer arrangement" (see paragraph [0038]). In connection with FIG. 14, US20060279542A1 discloses that preferably the motion sensors is mounted on the back of the device, apparently on an outer surface of the device (see paragraph [0046]). US20060279542A1 discloses the use of accelerometers and gyroscopes as motion sensors for the handheld device, in particular a gyroscopic cube with a side of approximately 1 cm and up to three accelerometers (see paragraph [0059]). US20060279542A1 does not disclose any architectural details of how the gyroscopes and accelerometers could be incorporated into the handheld device, and does not contemplate any close integration between one or more accelerometers and one or more gyroscopes. Consequently, US20060279542A1 does not disclose, and does not suggest any desirability or avenue for the development of, a handheld device that incorporates a set of closely-integrated accelerometer and gyroscope motion sensors, where the device facilitates personal communications and provides access to a broad range of visual content made available by or through the device.

PCT patent application WO03001340A2 discloses a handheld device that incorporates motion sensors and can be used to interpret certain user gestures. According to WO03001340A2, before gesture recognition can be performed, the device of WO03001340A2 must necessarily perform a classification step that assigns gesture data according to broad criteria to on of a plurality of predetermined classes (see lines 30-34 on page 5). The motion sensors incorporated in the device disclosed in WO03001340A2 may include up to three accelerometers and up to three gyroscopes (see lines 16-19 on page 7). FIG. 5 of WO03001340A2 shows the various motion sensors as discrete and independent sensors. WO03001340A2 does not disclose any architectural details of how the gyroscopes and accelerometers could be incorporated into the handheld device, and does not contemplate any close integration between one or more accelerometers and one or more gyroscopes. Consequently, WO03001340A2 does not disclose, and does not suggest any desirability or avenue for the development of, a handheld device that incorporates a set of closely-integrated accelerometer and gyroscope motion sensors, where the device facilitates personal communications and provides access to a broad range of visual content made available by or through the device.

United States patent application US20030231189A1 discloses a handheld device that uses motion sensors to permit user manipulation of content displayed on an integrated screen. The motion sensors disclosed in US20030231189A1 may include one or more accelerometers and one or more gyroscopes. US20030231189A1 does not disclose any architectural details of how the gyroscopes and accelerometers could be incorporated into the handheld device, and does not contemplate any close integration between one or more accelerometers and one or more gyroscopes. Consequently, US20030231189A1 does not disclose, and does not suggest any desirability or avenue for the development of, a handheld device that incorporates a set of closely-integrated accelerometer and gyroscope motion sensors, where the device facilitates personal communications and provides access to a broad range of visual content made available by or through the device.

Based on the inventors' research, a sophisticated handheld device that incorporates motion sensors, provides the functionality of a mobile phone and facilitates user interaction with visual content provided by or through the device would require a graphical user interface that is particularly adapted to utilize the motion sensing capabilities of the device. Various extensions and modifications of traditional computer graphical user interfaces have been introduced in the existing art. For example, United States patent application US20090037848A1 discloses a graphical user interface that displays various objects together with a graphical representation of the relationships between the objects (see, e.g., FIG. 2 displaying enterprise objects and graphical relationships between the enterprise objects). Prior art systems and methods such as the one described in the US20090037848A1 do not provide good platforms for developing a handheld device with integrated motion sensors that facilitates personal communications and provides access to visual content made available by or through the device.

It is a clear conclusion that none of these devices or components are capable of detecting motion along three gyroscope axes and three accelerometer axes while serving as a good platform for development of a handheld electronic device adequate for personal communications. Further, it is clear that none of these devices or components have achieved any significant integration of accelerometers and gyroscopes in a single module, and such integration is not in any way obvious, suggested by, or otherwise directly facilitated by the existing art.

SUMMARY OF THE INVENTION

The invention of the present application relates to interacting with handheld electronic devices and content using motion processing. In one aspect, a handheld electronic device includes a subsystem providing display capability, a set of motion sensors sensing rotational rate around at least three axes and linear acceleration along at least three axes, and a subsystem which, based on motion data derived from at least one of the motion sensors, is capable of facilitating interaction with the device.

In another aspect, a handheld electronic device includes a display attached to the device, and a set of motion sensors sensing rotational rate around at least three axes and linear acceleration along at least three axes, where the motion sensors are integrated in a single module. The device also includes a subsystem which, based on motion data derived from at least one of the motion sensors, is capable of facilitating interaction with the device.

In another aspect, a storage medium includes a software program, the software program capable of running on a handheld electronic device. The device includes a subsystem providing display capability and a set of motion sensors sensing rotational rate around at least three axes and linear acceleration along at least three axes. The software application is capable of facilitating interaction with the device based on motion data derived from at least one of the motion sensors.

In another aspect, a set of motion sensors senses rotational rate around at least three axes and linear acceleration along at least three axes, where the motion sensors are capable of being integrated in a handheld electronic device. The device includes a subsystem providing display capability, and a subsystem which, based on motion data derived from at least one of the motion sensors, is capable of facilitating interaction with the device.

In another aspect, a handheld electronic device includes a subsystem providing display capability, a motion function trigger, a set of motion sensors sensing rotational rate around at least three axes and linear acceleration along at least three axes, and a subsystem. Based on motion data derived from at least one of the motion sensors, the subsystem is capable of facilitating interaction with the device.

Aspects of the described inventions include a handheld electronic device allowing accurate motion data sensing that allows robust, intuitive and accurate control of functions of the handheld device. Aspects allow a user to easily access and control electronic device functions using motion of the device.

DETAILED DESCRIPTION

The present invention relates generally to motion sensing devices, and more specifically to interacting with mobile devices and content using motion processing. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Aspects of the present invention described herein provide enhanced functionality of a handheld electronic device by using device motion to control functions of the device. Control over device functions using motion of the device can allow easier and quicker control over those functions, as well as reduce wear on the device from use of physical elements such as a touchscreen, buttons, switches, and so on.

Figure 1:
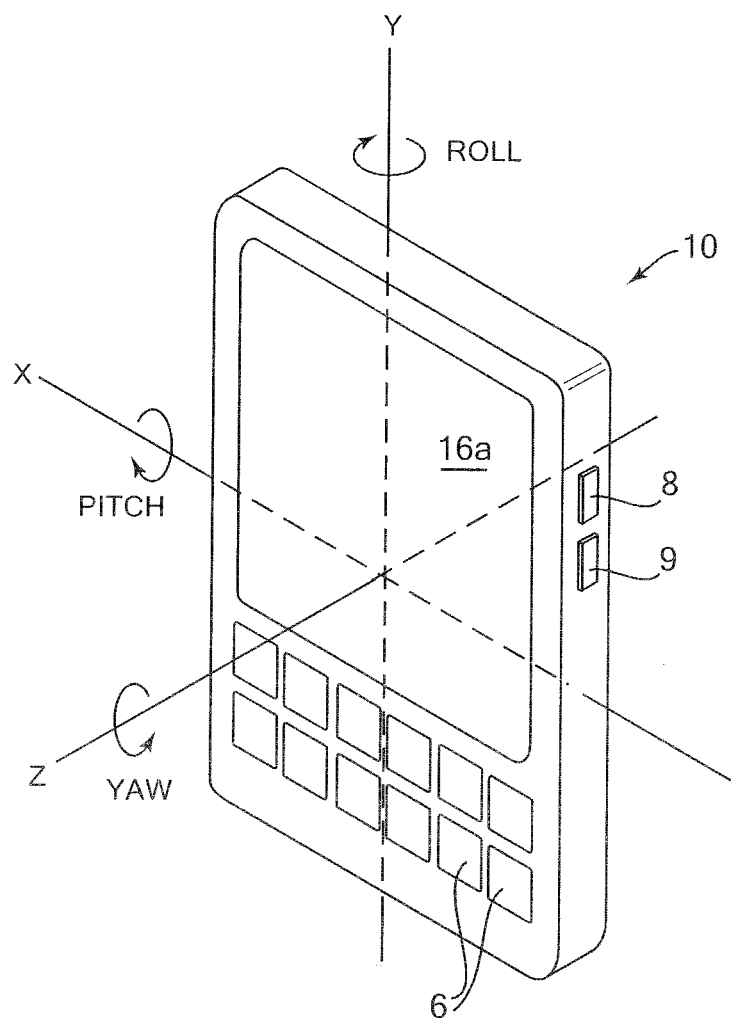
FIG. 1 is a perspective view of one example of a motion sensing handheld device suitable for use with the present inventions.

FIG. 1 is a perspective view of one example of a motion sensing handheld device 10 suitable for use with aspects of the inventions described herein. Device 10 can be held in one or more hands of a user to be operated, and can include a variety of different functions, as described below. As used herein, the terms "include," "including," "for example," "e.g.," and variations thereof, are not intended to be terms of limitation, but rather are intended to be followed by the words "without limitation." In the example embodiment shown, device 10 can include a display screen 16a, and physical buttons 6. Furthermore, some embodiments can include one or more buttons 8 and 9 on one or both sides of the device 10, which can be pressed and/or held by the user, for example, to allow motion gestures to be input in different modes of operation to change different states of the device, as described in greater detail below. Other embodiments of devices can be used, and can include different and/or additional input and output devices, as described below with respect to FIG. 2.

In accordance with an aspect of the invention, the device 10 can be moved by the user in space, and this movement is detected by motion sensors of the device as detailed below. As referred to herein, rotation of the device 10 can include pitch, roll, and yaw about the various rotational axes, as shown in FIG. 1. These axes can be defined differently in other embodiments. Furthermore, linear motions can be made along the linear axes x, y and z. Furthermore, these axes can be defined at various different positions on the device (for example translated or rotated with respect to the axes shown in FIG. 1, or otherwise transposed into any other coordinate system (whether rectangular, polar, or otherwise)), as appropriate for the hardware and software used by the device 10.

Figure 2:
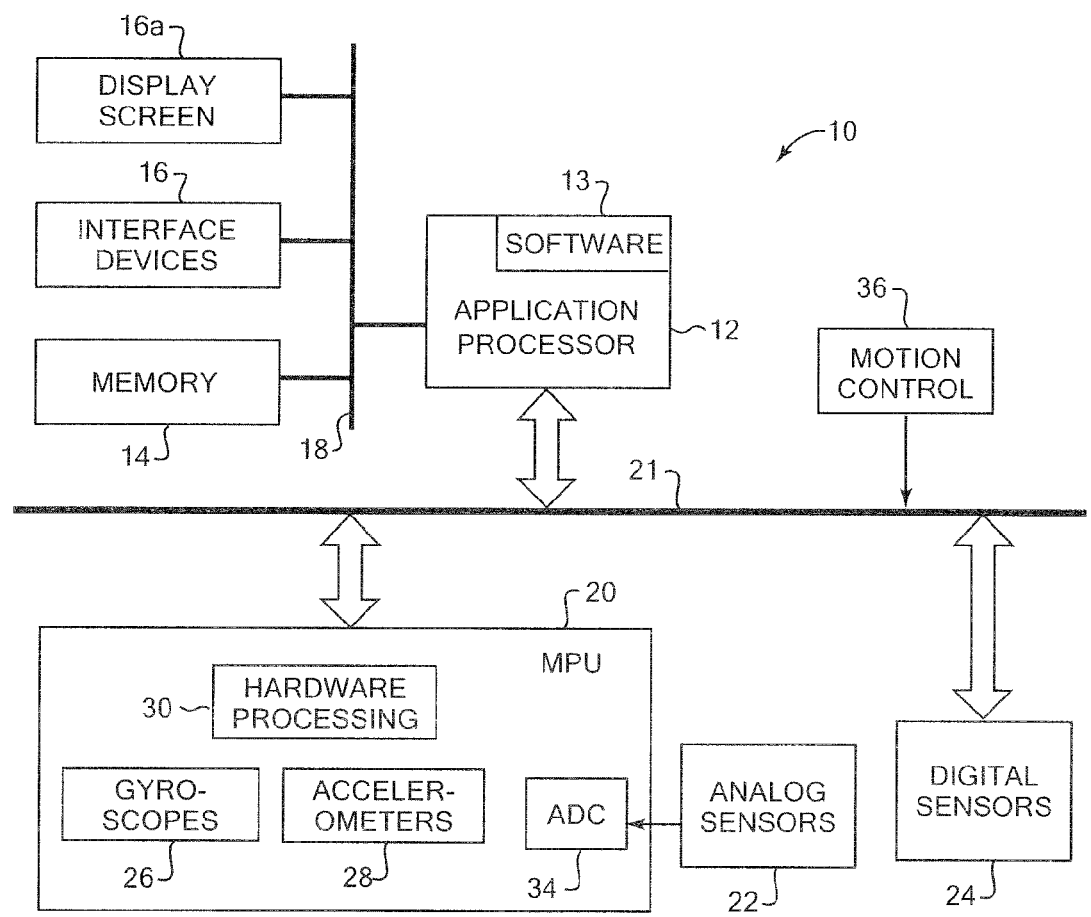
FIG. 2 is a block diagram of one embodiment of a motion sensing system suitable for use with the present inventions.

FIG. 2 is a block diagram of one example of device 10 or a motion sensing system suitable for use with aspects of the present invention. Device 10 can be implemented as a device or apparatus, such as a handheld device that can be moved in space by a user and its motion and/or orientation in space therefore sensed. For example, such a handheld device can be a mobile phone (e.g., cellular phone, a phone running on a local network, or any other telephone handset), wired telephone (e.g., a phone attached by a wire), personal digital assistant (PDA), video game player, video game controller, navigation device, mobile internet device (MID), personal navigation device (PND), digital still camera, digital video camera, binoculars, telephoto lens, portable music, video, or media player, remote control, or other handheld device, or a combination of one or more of these devices. In some embodiments, the device 10 is a self-contained device that includes its own display and other output devices in addition to input devices. In other embodiments, the handheld device 10 only functions in conjunction with a non-portable device such as a desktop computer, electronic tabletop device, server computer, etc. which can communicate with the moveable or handheld device 10, e.g., via network connections. The device may be capable of communicating via a wired connection using any type of wire-based communication protocol (e.g., serial transmissions, parallel transmissions, packet-based data communications), wireless connection (e.g., electromagnetic radiation, infrared radiation or other wireless technology), or a combination of one or more wired connections and one or more wireless connections.

Device 10 includes an application processor 12, memory 14, interface devices 16, a motion processing unit 20, analog sensors 22, and digital sensors 24. Application processor 12 can be one or more microprocessors, central processing units (CPUs), or other processors which run software programs for the device 10 or for other applications related to the functionality of device 10. For example, different software application programs such as menu navigation software, games, camera function control, navigation software, and phone or a wide variety of other software and functional interfaces can be provided. In some embodiments, multiple different applications can be provided on a single device 10, and in some of those embodiments, multiple applications can run simultaneously on the device 10. In some embodiments, the application processor implements multiple different operating modes on the device 10, each mode allowing a different set of applications to be used on the device and a different set of gestures to be detected. As used herein, unless otherwise specifically stated, a "set" of items means one item, or any combination of two or more of the items.

Multiple layers of software can be provided on a computer readable medium such as electronic memory or other storage medium such as hard disk, optical disk, flash drive, etc., for use with the application processor 12. For example, an operating system layer can be provided for the device 10 to control and manage system resources in real time, enable functions of application software and other layers, and interface application programs with other software and functions of the device 10. A motion algorithm layer can provide motion algorithms that provide lower-level processing for raw sensor data provided from the motion sensors and other sensors. A sensor device driver layer can provides a software interface to the hardware sensors of the device 10.

Some or all of these layers can be provided in software 13 of the processor 12. For example, in some embodiments, the processor 12 can implement the gesture processing and recognition described herein based on sensor inputs from a motion processing unit (MPU™) 20 (described below). Other embodiments can allow a division of processing between the MPU 20 and the processor 12 as is appropriate for the applications and/or hardware used, where some of the layers (such as lower level software layers) are provided in the MPU. For example, in embodiments allowing processing by the MPU 20, an API layer can be implemented in layer 13 of processor 12 which allows communication of the states of application programs running on the processor 12 to the MPU 20 as well as API commands (e.g., over bus 21), allowing the MPU 20 to implement some or all of the gesture processing and recognition described herein. Some embodiments of API implementations in a motion detecting device are described in co-pending patent application Ser. No. 12/106,921, incorporated herein by reference in its entirety.

Device 10 also includes components for assisting the application processor 12, such as memory 14 (RAM, ROM, Flash, etc.) and interface devices 16. Interface devices 16 can be any of a variety of different devices providing input and/or output to a user, such as a display screen, audio speakers, buttons, switch, touch screen, joystick, slider, knob, printer, scanner, camera, computer network I/O device, other connected peripheral, etc. For example, one interface device 16 included in many embodiments is a display screen 16a for outputting images viewable by the user. Memory 14 and interface devices 16 can be coupled to the application processor 12 by a bus 18.

Device 10 also can include a motion processing unit (MPU™) 20. The MPU is a device including motion sensors that can measure motion of the device 10 (or portion thereof) in space. For example, the MPU can measure one or more axes of rotation and one or more axes of acceleration of the device. In preferred embodiments, at least some of the motion sensors are inertial sensors, such as gyroscopes and/or accelerometers. In some embodiments, the components to perform these functions are integrated in a single package. The MPU 20 can communicate motion sensor data to an interface bus 21, e.g., I2C or Serial Peripheral Interface (SPI) bus, to which the application processor 12 is also connected. In one embodiment, processor 12 is a controller or master of the bus 21. Some embodiments can provide bus 18 as the same bus as interface bus 21.

MPU 20 includes motion sensors, including one or more rotational motion sensors (gyroscopes) 26 and one or more linear motion sensors (accelerometers) 28. For example, in some embodiments, inertial sensors are used, where the rotational motion sensors are gyroscopes and the linear motion sensors are accelerometers. Gyroscopes 26 can measure the angular velocity of the device 10 (or portion thereof) housing the gyroscopes 26. From one to three gyroscopes can typically be provided, depending on the motion that is desired to be sensed in a particular embodiment. Some implementations may employ more than three gyroscopes, for example to enhance accuracy, increase performance, or improve reliability. Some gyroscopes may be dynamically activated or deactivated, for example to control power usage or adapt to motion processing needs. Accelerometers 28 can measure the linear acceleration of the device 10 (or portion thereof) housing the accelerometers 28. From one to three accelerometers can typically be provided, depending on the motion that is desired to be sensed in a particular embodiment. Some implementations may employ more than three accelerometers, for example to enhance accuracy, increase performance, or improve reliability. Some accelerometers may be dynamically activated or deactivated, for example to control power usage or adapt to motion processing needs. For example, if three gyroscopes 26 and three accelerometers 28 are used, then a 6-axis sensing device is provided providing sensing in all six degrees of freedom. In embodiments with more than three gyroscopes and/or more than three accelerometers, additional degrees of freedom (or sensing axes) can be provided, and/or additional sensor input can be provided for each of the six axis of motion. In some embodiments, a single chip six-axis inertial measurement unit is used in the MPU 20. In some embodiments, additional or alternate types of rotational rate sensors and/or linear acceleration sensors can be used.

In some embodiments the gyroscopes 26 and/or the accelerometers 28 can be implemented as MicroElectroMechanical Systems (MEMS). For example, three gyroscopes and three accelerometers can be integrated into a MEMS sensor wafer. Other embodiments may integrate more or less inertial sensors. Supporting hardware such as storage registers for the data from gyroscopes 26 and accelerometers 28 can also be provided.

In some embodiments, the MPU 20 can also include a hardware processor or processing block 30. Hardware processing block 30 can include logic, microprocessors, or controllers to provide processing of motion sensor data in hardware. For example, motion algorithms, or parts of algorithms, may be implemented by block 30 in some embodiments, and/or part of or all the gesture recognition described herein. In such embodiments, an API can be provided for the application processor 12 to communicate desired sensor processing tasks to the MPU 20, as described above. Some embodiments can provide a sensor fusion algorithm that is implemented by the hardware processing block 30 to process all the axes of motion of provided sensors to determine the movement of the handheld electronic device in space. Some embodiments can include a hardware buffer in the block 30 to store sensor data received from the gyroscopes 26 and accelerometers 28. One or more motion function triggers 36, such as buttons 6, 8, 9 or other control, can be included in some embodiments to control the input of gestures to the electronic device 10, as described in greater detail below.

Examples of an MPU, integrated sensor units, and systems suitable for use with the present invention are described in co-pending U.S. patent application Ser. Nos. 11/774,488 and 12/106,921, all incorporated herein by reference in their entireties. Suitable implementations for MPU 20 in device 10 are available from InvenSense, Inc. of Sunnyvale, Calif.

The device 10 can also include other types of sensors. Analog sensors 22 and digital sensors 24 can be used to provide additional sensor data about the environment in which the device 10 is situated. For example, sensors such one or more barometers, compasses or magnetometers, temperature sensors, optical sensors (such as a camera sensor, infrared sensor, etc.), ultrasonic sensors, radio frequency sensors, or other types of sensors can be provided. For example, a compass or magnetometer sensor can provide an additional one, two, or three axes of sensing, such as two horizontal vectors and a third vertical vector. In the example implementation shown, digital sensors 24 can provide sensor data directly to the interface bus 21, while the analog sensors can be provide sensor data to an analog-to-digital converter (ADC) 34 which supplies the sensor data in digital form to the interface bus 21. In the example of FIG. 2, the ADC 34 is provided in the MPU 20, such that the ADC 34 can provide the converted digital data to hardware processing 30 of the MPU or to the bus 21. In other embodiments, the ADC 34 can be implemented elsewhere in device 10.

Element Selection

According to various embodiments of the present invention, the motion sensors of the device 10 can be used to control selection from a set of elements displayed on the display screen 16a of the device, such as a set of icons (whether displayed as a two dimensional array, in a three dimensional structure, or in any other manner capable of presenting data for user review or interaction), a menu containing a list of items, or a set of image thumbnails, or any other elements that can be displayed for user review or interaction. The selection of other similar sets of discrete elements may also be controlled using the features described herein. Displayed objects or areas of a variety of shapes and configurations can be selected as elements, including 2-D objects or 3-D objects displayed on a 2-D display screen. For example, one or more cubes, spheres, rectilinear shapes, dials, surfaces, backgrounds, sections or portions of a displayed object or area, or other displayed objects.

FIGS. 3A-3F show examples of a display of icons presented on the display screen by an icon selection software application or operating system running on the device (an operating system can be considered a "software program" for the purposes of this document). In addition to operating systems, software programs may also include any software application or functionality, and any process, task, thread or other aspect of any operating system or application. A handheld device may have one or more operating systems running on it, or no operating system if the device is not initialized yet or if the functionality traditionally associated with an operating system is provided by any combination of hardware, firmware or software applications. A software program may run fully on a handheld device. Alternatively, a software program may run partially on a handheld device and partially on an external system. An example of a case where a software program runs at least partially on a handheld device includes an embodiment where the software program running on the handheld device is part of a larger software program, with the larger software program also including a module that runs on an external system (e.g., the module running on the external system may support, complement or otherwise provide functionality for the software program running on the handheld device).

Examples of such external systems include a peripheral component connected to the handheld device, a consumer device connected to the handheld device (for example a television set, an audio and/or video content server, or any other end user system capable of being accessed by the handheld device as part of a local area network set up in a home, office or otherwise surrounding a user), a server connected to the handheld device (for example a server that is part of a network infrastructure, otherwise supports, or can be accessed via a wireless network to which the handheld device may connect), any other computer or server that may provide content or other application support to the handheld device (for example a server running an application that can be accessed by the handheld device, such as a photo sharing application or an application permitting access to audio, video or other content accessible on such server), or any combination of the foregoing.

A two-dimensional array of icons may be presented such that the user can select one of the icons to initiate an application to execute on the device 10. In this example, to select an icon, the user holds down or otherwise activates a motion function trigger, such as a button, to enter a selection mode of the device that allows selection of an icon or other element, and rotates the device in space. Motion function triggers are discussed in further detail below. As the device is rotated, the icon selection application tracks this device movement and highlights icons based on the movement. In one embodiment, rotational movement of the device 10 about the roll axis (e.g., left-right rotation) is used to move the highlighting indicator left or right, and rotational movement about the pitch axis (e.g., up-down rotation) is used to move the highlighting indicator up or down. Other device movements about or along different axes can be used for highlighting movement in other embodiments.

In various embodiments, the interactions with a device that are described herein in connection with the activation of a motion function trigger can also be implemented in the absence of a motion function trigger, or can take place in the presence of a motion function trigger but without the activation of the motion function trigger.

In some embodiments, the interactions with a device that are described herein without direct reference to a motion function trigger can also be implemented based on the activation of a motion function trigger.

Figure 3A:
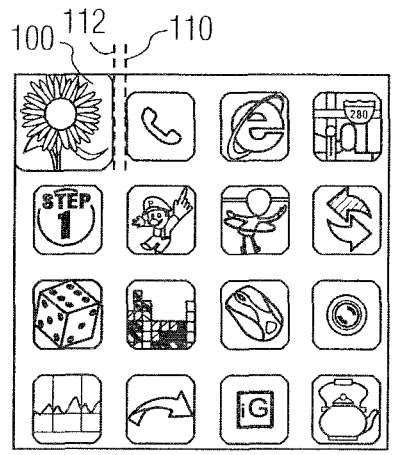
FIGS. 3A-3E are diagrammatic illustrations of an example of a display of elements able to be selected using device motion.

The highlighting of an icon can be implemented in a variety of ways. For example, the icon can be displayed larger than the non-highlighted icons, or brighter, or with a different, noticeable color. In the present example, the highlighted icon is displayed larger than the other icons, as shown in FIG. 3A. Other embodiments can display a cursor or other indicator over a highlighted icon.

According to various embodiments, a visual indicator (or, in short form, "indicator") is an artifact displayed on a screen to facilitate interaction with the device by a user. Examples of visual indicators include a cursor, an insertion bar, an insertion point, or any other pointer or indicator element that may be displayed in a graphical interface. A visual indicator may be used to track position on a display (e.g., a cursor moving in a window), to select a visual element, to interact with an icon (e.g., selecting an icon), to perform an action associated with the icon (e.g., opening a folder associated with the icon, opening a file associated with the icon), to start an application associated with the icon (e.g., start a phone application associated with the icon, place a phone call to an individual associated with the icon, start a photo viewing application to view a picture associated with the icon), or to perform any other activity related to the icon.

According to various embodiments, an icon may be any graphical artifact that can be rendered by a display device, including representations of files (e.g., photographs, other graphics, video, audio, and any other multimedia files), folders, directories, applications, text, keys of an input interface (e.g., letters, numbers and other symbols of a keyboard displayed graphically, whether the keyboard is static or its keys are changing dynamically in response to user actions), and any other similar graphical representation that can be visually presented to a user.

Certain embodiments of the present invention relate to various "visual elements" (or, in short form, "elements") capable of being displayed to a user. Examples of such visual elements include icons, menus, menu bars, windows, window bars, boxes, checkboxes, links, hyperlinks, lists of items (e.g., songs, photos, videos, emails, text messages), any combination or subset of the foregoing, and any other visual artifact that can be displayed to a user to convey information. Various embodiments described herein in reference to particular visual elements (e.g., icons) may also apply to other visual elements.

In various implementations, interaction with visual elements may include highlighting visual elements, moving visual elements, reordering lists or sets of visual elements, scrolling lists or sets of visual elements, deleting or adding visual elements, converting visual elements to different visual elements, or any other activities associated with the manipulation, activation or other interaction with such visual elements.

In one embodiment, the highlighting forms a type of cursor or indicator which indicates which icon will be selected when the button is released. When the device has been moved such that a desired icon is highlighted, the user releases the button to select the desired icon, which typically causes one or more states of the device to change and/or one or more functions to be performed on the device, such as initiating one or more associated application programs. If the user decides not to select any icon after holding the button, the user can perform an exit motion gesture or other exit input to cause the device to exit the selection mode. For example, the user can shake the phone to input a shake gesture before releasing the button, indicating that no icon is to be selected and to exit the selection mode. Other motion gestures or control inputs can be used similarly in other embodiments. A "gesture" or "motion gesture," as referred to herein, is a motion or set of motions of the device (whether predefined or not) which, when recognized by the device to have occurred, triggers one or more associated functions of the device (or changes one or more states of the device, e.g., the changing of a status or display, the selection of a function, and/or the execution or activation of a function or program). This motion can be a more complex set of motions such as a shake or tap or circle motion, or can be a simple axial movement or static, continuous orientation of the device, such as tilting or orienting the device in particular axes or over a particular angle. The associated functions can include, for example, scrolling a list or menu displayed on a display screen of the device in a particular direction, selecting and/or manipulating a displayed item (button, menu, control), providing input such as desired commands or data (such as characters, etc.) to a program or interface of the device, turn on or off main power to the device, and so on, many examples of which are described herein.

Motion gesture recognition can be implemented using one or more heuristics and/or algorithms that interpret the sensor motion data to determine which gesture(s) have been input. For example, the device can pre-process raw sensor data from the sensors by changing coordinate systems or converting to other physical parameters, such that resulting "augmented data" looks similar for all users regardless of the small, unintentional differences in user motion. This augmented data can then be used to train learning systems or hard-code pattern recognizers resulting in much more robust gesture recognition. Some embodiments of methods for recognition of gestures and motions of a device are also described in copending U.S. patent application Ser. No. 12/252,322, entitled, "Mobile Devices with Motion Gesture Recognition," filed Oct. 15, 2008, and incorporated by reference herein in its entirety.

To make the selection of icons easier, visual feedback can also be provided on the display to indicate how the user is rotating the device. For example, an actual cursor or other indicator can be shown overlayed on top of the icons, moving continuously in accordance with device motion. When the cursor is primarily displayed on top of a particular icon, that icon becomes highlighted, indicating that it will be selected if the button is released.

Figure 3B:
Figure 3C:
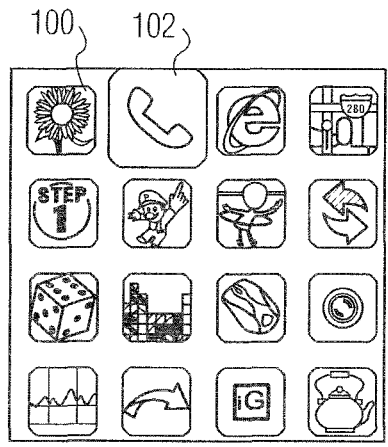
Figure 3D:
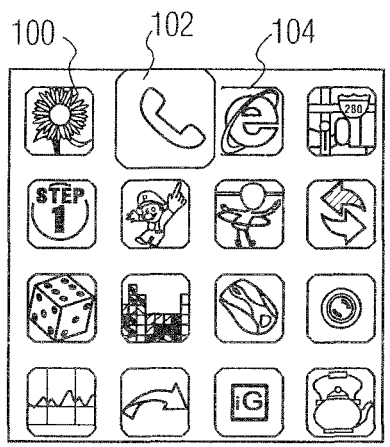
Figure 3E:
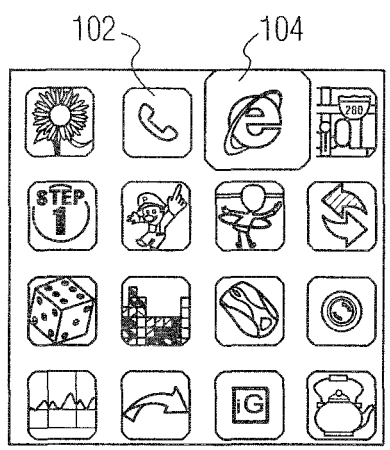

FIGS. 3A-3E show one embodiment in which highlighted icons are themselves moved continuously by a small amount in accordance with device motion in order to help the user control which icon is highlighted. In some embodiments, the small amount can be less than half the size of an unhighlighted icon, for example, and may be much smaller. The icon 100 in FIG. 3A is highlighted by being displayed larger than the other icons, and the user rotates the device 10 to the right (e.g., roll movement), intending to select an icon displayed to the right of the highlighted icon. As shown in FIG. 3B, this motion causes the highlighted icon 100 to move continuously to the right on the display screen, in conjunction with the continuous device motion. At some point, shown in FIG. 3C, the highlighted icon 100 has moved to a threshold limit at the right, which causes the next icon 102 displayed in the moved direction to become highlighted and the former highlighted icon 100 to be displayed in its usual, unhighlighted form. When the user continues the motion of the device to the right, the highlighted icon 102 is similarly continuously and slightly moved to the right, as shown in FIG. 3D, and when the right limit to icon 102 is reached and device motion is continued, the next icon 104 is then highlighted and icon 102 unhighlighted. The same highlighting method can be used in all directions from an icon, e.g., in left, up, down, diagonal directions in addition to the right direction described, possibly in response to a combination of rotational movement about the pitch axis and rotational movement about the roll axis of the electronic device.

In some embodiments, the algorithm for selecting the icon can primarily rely on roll and pitch gyroscopes of the device, which measure angular velocity about roll and pitch axes of the device 10. This angular velocity can be integrated to provide angles that indicate how much the device has been moved. However, icon selection may also be controlled using a yaw rotation of the device 10. Other control signals may be implemented by combining gyroscope axes. For example, by combining yaw and pitch, a circular movement may be used to scroll through a set of icons. These control signals may be derived only from gyroscopes of the device, or they may be derived from a combination of any of gyroscopes, accelerometers, and magnetometers of the device as the output of a sensor fusion algorithm (e.g., an algorithm combining inputs from multiple sensors to provide more robust sensing, an example of which is described in copending U.S. patent application Ser. No. 12/252,322, incorporated herein by reference).

In some embodiments, hysteresis can be used to ensure that noise provided from the sensors and/or from the user's hand shaking does not cause the highlighting to perform in undesired ways, such as jumping back and forth quickly between two icons. For example, as indicated in FIG. 3A, one threshold limit 110 may be used when determining when to move the highlighting from icon 100 on the left to icon 102 on the right based on device movement, and a different threshold limit 112 (at a different display screen position than threshold limit 110) may be used when determining when to move the highlighting from an icon on the right to an icon on the left based on opposite device movement (the thresholds are typically not displayed). Modifying the threshold in this way reduces the apparent noise, and can make the system easier to control. Other algorithms that filter out hand shake and reduce drift may also be used to improve the usability of the device.

In a different embodiment, a menu containing a vertically arranged list of items may be controlled by using a pitch device rotation (up-down rotation). In another embodiment, a menu containing a vertically arranged list of items may be controlled by using an approximate circular movement of the device in space, i.e., tracing a circle or similar shape in space by moving the device in an approximately circular motion. Rotating the device clockwise can, for example, move a displayed cursor in one direction, and rotating the device counter-clockwise can move the cursor in the opposite direction.

In one embodiment, a set of elements such as an icon grid or a menu are displayed by the display screen of the device. The user holds down the button and uses rotation to highlight an element, and releases the button to select it, as described above. This may cause an application to start, or may cause a new menu or set of elements to be displayed. A hierarchy of levels of elements may also be provided. The user can navigate forward into sets of elements, sub-menus, or screens by depressing the button, moving a cursor or highlight, and releasing the button to select the element and display a new sub-menu or screen of elements. The user can navigate backward to higher or previous menus or levels in the hierarchy, by pressing, for example, a different control. Different buttons can be used for forward and for backward navigation. For example, the user can press a "go back" button on the device 10. Alternatively, a single button (or other control) can be used for both forward and back navigation. For example, a sequence of press and hold the button, move the device, and releasing the button causes the device and screen to move forward in the hierarchy, whereas a quick press-and-release of the button by the user causes the device and screen to go back in the hierarchy. In another embodiment, a motion gesture such as a shaking movement, tapping, or other gesture may be used to go back to a previous level in the hierarchy.

Panning and Zooming

Figure 4A:
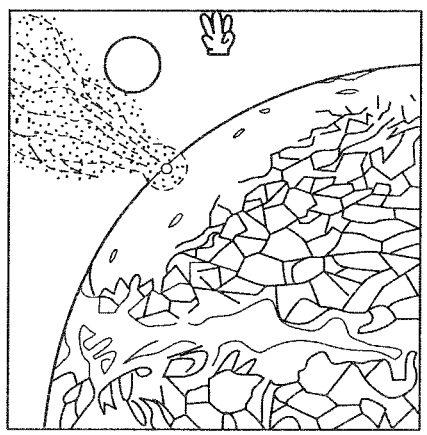
FIGS. 4A-4C are diagrammatic illustrations of panning and zooming performed on a display screen using device motion.
Figure 4B:
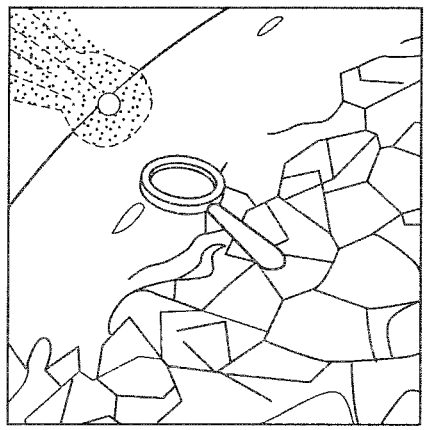
Figure 4C:
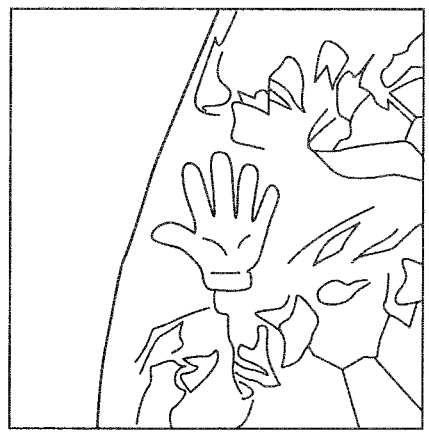

Panning and zooming can be performed on images displayed by the display screen of the device 10. Moving an image (or the displayed view of an image) to the left, right, up and down is called panning, while bringing a view of the image (or part of the image) closer or further away is called zooming. Herein, the term "zooming" may include both zooming in (closer view) and zooming out (further view). For example, FIG. 4A shows an image displayed on the display screen of the device. In FIG. 4B, the image has been zoomed in more closely. In FIG. 4C, the zoomed image of FIG. 4B has been panned to the left and down.

In some embodiments, rotation of the device may be used to manipulate an image continuously to perform panning of the image. Device rotation may also be used to zoom the image to a larger or smaller size on the screen. The image may be a graphical image, or a document such as text document, a PDF, a web page, or other similar types of documents.

In some embodiments, applying roll and pitch rotation to the device while holding a button down can provide image panning. For example, roll movement can cause the image (or view of the image) to move left or right, and pitch movement can cause the image or view to move up and down. In some embodiments, the image or view can be so manipulated only when the button is depressed and held by the user.

Some embodiments can control zooming in a displayed view by moving the device approximately along a linear axis, such as in-and-out movement along the z axis shown in FIG. 1 (e.g., in to zoom in, out to zoom out, or some other control scheme), or alternatively linear movement along the x-axis or y-axis. For example, the in-out z-axis movement may be tracked by observing the linear acceleration vector from accelerometer data, after the component of gravity has been removed from the accelerometer data using the gyroscope data (e.g. using model equations such as those described in copending U.S. patent application Ser. No. 12/252,322, incorporated herein by reference). Furthermore, motion of a device along the z-axis often can include some rotational motion, such as rotational motion about the rotational axis of the user's elbow as the device is moved by the user's arm. The gyroscopes of the device can be used to detect such rotational motion to help to more precisely measure the amount of device motion approximately along the z-axis.

In some embodiments, the linear acceleration vector of accelerometer data may also be combined with information from a camera system on the device 10, using well known methods such as optical flow in which optical images are analyzed to determine direction and amount of movement of the device 10. This can provide a more robust in-out control signal in some embodiments.

Some embodiments can provide a zooming function when the device is manipulated with a pitch rotation. Since in some embodiments this may be the same type of device movement that causes the image to pan up and down (or perform some other panning function), a second motion function trigger (such as a button) can be used for zooming, such as holding the second button while zooming. Alternatively, a single trigger may be used for zooming and panning, where, for example, the trigger is activated (and released) a first time by the user for a panning mode and is activated a second time in order to switch to a zooming mode.

In another embodiment, a yaw rotation of the device may be used to control zooming. In some embodiments, a single button may be used to enter a mode in which the image can be manipulated using motion, where roll movement pans the image left and right, pitch movement pans the image up and down, and yaw movement zooms the image (or view of the image) to be larger and smaller. Since the user may provide cross-axis movement of the device, whether intended or not (e.g., movement in two rotation axes, such as roll and pitch), this may be confusing, as the displayed image might zoom and pan at the same time. To prevent this, a threshold may determine whether panning is being selected or zooming is being selected. If a type of movement is primarily roll or pitch, as determined by an amount of movement in the particular axis over the associated threshold, then panning is used on the image. Similarly, if the movement is primarily yaw, zooming is used. An icon or other displayed message or element may also be displayed which indicates whether panning or zooming is being used. For example, as shown in FIG. 4B, a magnifying glass can be displayed when in zooming mode and/or zooming is occurring. As shown in FIG. 4C, a hand symbol can be displayed when in panning mode and/or panning is occurring. Alternatively, or in addition, non-visual output can indicate the current operation or function, such as audio, tactile, or other feedback.

In some embodiments, zooming may always occur at the center of the view of the image as currently displayed on the screen. In this case, the user can first pan to the desired location, and then zoom. Some area outside the view of the image can be stored in a buffer in this case; for example, if the user wishes to zoom in on one corner of the image, it should be possible to position that corner at the center of the screen, and then zoom in. Alternatively, the user can be required to first zoom in to the desired zoom level, and then pan to the desired location. In other embodiments, the zooming may occur at a location of the image indicated by an indicator such as a cursor. This cursor may ordinarily be in the center of the screen, but may be moved around the screen by the user when the image itself can't be panned any further. In this embodiment, no buffer is required. The cursor that indicates where the zooming will occur may also be the icon which indicates whether panning or zooming is occurring.

A cursor may also or alternatively be used to select part of the image. For example, in the case of a web page, the cursor may be positioned above a link, and then used to select that link using a control (such as a button) or gesture (such as a tapping gesture).

If yaw device rotation is used to zoom, in some embodiments the effect may be visually confusing because the screen itself rotates with respect to the user as the device is rotated. To reduce user confusion, the image on the screen may be rotated to compensate for the user's yaw rotation. In one embodiment, while the button is depressed and yaw rotation is applied to the device, the image displayed in the screen is rotated in the opposite direction by a corresponding amount so that it maintains the correct orientation relative to the user. When the button is released, the screen orientation can return to its ordinary orientation. Other controls can be used in other embodiments.

In one example, an application running on the device may be a camera application (whether photo or video). The control signal used for zooming, e.g., pitch or yaw rotation, or forward-backward linear movement, may control the optical or digital zoom of the camera in preparation for taking a picture or during video recording. In various embodiments, control of a camera may take place with or without a motion function trigger. In one implementation, the zoom function of a camera is activated in response to a user pressing a button and is deactivated when the user releases the button (or after a predefined period of time after the user releases the button).

Additional Element Selection

In some applications, lists or arrays of displayed elements such as icons may contain more elements that can be presented on the screen. Various control methods can be used to display and select such elements. In some embodiments, the control motion (such as roll, pitch, or yaw) that is used to control the element selection, can also be used to select elements not visible, by scrolling past the elements visible such that the non-visible elements move into the visible area of the display screen.

In other embodiments, the zooming function described above can be used to zoom the view on the display screen out to view an entire set of elements or zoom in to view a desired subset of the elements at a desired location. Alternatively, selecting an element that represents a group of sub-elements can cause those sub-elements to become visible on the screen.

In another embodiment, pages of elements can be changed by using a gesture, such as a shaking movement or a triple tap. For example, a triple tap can cause the current page of elements to be replaced by the next page of elements. Alternatively, shaking can be used; in this case, the direction of the shake can determine whether the current page of elements will be replaced by the next page of elements (e.g., for movement in one direction along a movement axis) or the previous page of elements (for movement in the opposite direction along that movement axis).

In some cases, it may be necessary for the user to be able to adjust the location of displayed elements within a list or array. In this case, an element can be selected such that it is highlighted, but has not been activated (i.e. the associated function of the element not initiated). For example, the user can press a button 36, and use a control signal previously described such as roll, pitch, or yaw, to adjust the location of the element within the list or array. Releasing the button would cause the element to stick to its new location.

If a menu of elements is composed of multiple screens, the user can provide motion gestures (e.g., commands) to cause the device 10 to move to the next, or a different, menu screen. For example, a triple tap gesture (described below) can be input to move to the next menu screen. Or one type of gesture can be used to move to the next menu screen, while a different type of gesture can be used to move to the previous menu screen.

Character Selection

Element selection methods previously described, such as icon selection, may also apply in cases in which the elements to be selected are displayed keys or buttons that make up a displayed numeric keypad for use in a function such as a phone dialer or a calculator. In other embodiments, the elements make up an entire displayed alphabetical keyboard or other large set of characters such as symbols. Examples of "characters" include numbers, letters, punctuation symbols, other symbols, Chinese characters or other similar characters, or strokes within Chinese characters. In some embodiments, the characters presented can be selected using continuous movement of the device such as roll, pitch, or yaw, where the selection of a motion function trigger 36 is initially provided to initiate the selection mode. In one example, the characters may be displayed in a two-dimensional array and selected using a combination of two movements, such as pitch and roll to scroll the array and highlight different characters, or to provide x and y movement of cursor. Or characters may be presented in a one-dimensional list and selected using a single movement, such as pitch, to control the cursor in the one dimension, or scroll the list.

For systems with only a few available characters to select, such as a phone dialer that only has twelve characters (0, 1, 2, 3, 4, 5, 6, 7, 8, 9, *, and #), selection could be accomplished with a single degree-of-freedom (DOF) device movement to scroll elements, similar to that used with a rotary dial phone. In a rotary dial phone, the user turns a dial to the correct number and than releases the dial, allowing it to reset. Similarly, in some embodiments, a 1 degree-of-freedom (DOF) device movement such as roll, pitch, yaw, or a circular movement combining two of these (such as pitch and yaw) can be used to accomplish character selection when, for example, this motion is combined with the press and/or holding of a button 36. In one example, the user could be presented with a displayed graphic of a wheel similar to that of a rotary phone or a casino slot machine wheel, providing the characters (or other graphical icons or pictures) that can be selected. For example, the user can press and hold the button and scroll or rotate the wheel to the desired characters, then release the button and watch the wheel reset.

In some embodiments, it may only be necessary to enter a few characters before an auto-complete feature can be used to finish the string of characters. For example, when dialing a telephone number, in addition to using continuous motion to select the individual digits (or other characters) of the telephone number, continuous device motion can be used to select the completed number from a list of numbers provided by the auto-complete feature, comprising numbers associated with a speed-dial setting for the first digit entered by the user, numbers that begin with the digits entered by the user, and/or previously dialed numbers. The auto-complete list can be displayed alongside the digits, and updated automatically as further digits are selected, and navigating between digit entry and auto-complete list can be accomplished with continuous device motion as well. For example, if the digits are presented in a vertical column at the left of the screen, and the auto-complete menu is presented at the right of the screen, the user could select digits by pressing a button, scrolling to the desired digit with a pitch movement, and releasing the button. When the desired completed number appears on the auto-complete menu to the right, the user could hold the button and use a roll device movement to switch from the numeric column to the auto-complete column, and then release the button. Finally, to select the desired number from the auto-complete column, the user could hold the button, scroll to the desired number in the auto-complete column, and release the button.

Alternatively, a character selection list can be manipulated with one type of movement, and the auto-complete list can be manipulated with a second movement. For example, digits (or other characters) can be presented for selection in a list that is manipulated with a yaw device movement, while the auto-complete list can be manipulated with a pitch device movement. The user can depress the motion button 36, use a yaw movement to navigate to a digit, and release the button. When the desired contact or entry appears in the auto-complete menu based on the entered digit(s), the user can press the button, use a pitch movement to navigate to the desired contact in the auto-complete menu, and release the button to select that contact. To prevent both lists being active simultaneously, a threshold can be used to determine which list is active (digit selection list or auto-complete list). For example, after the button is depressed, either the pitch or yaw rotation of the device must pass a predefined threshold of rotation magnitude; the one that passes the threshold first determines which list is active.

In the telephone example, the dialing of the phone resulting from selecting an auto-complete list entry could happen immediately, or could be triggered by an additional gesture or button press.

Continuous motion gestures can be combined with discrete gestures for further control. For example, a discrete gesture can be used for deleting a last character entered, clearing all entered characters, activating auto-complete, or executing a related task such as dialing a number. The discrete gesture may be, for example, a previously described gesture such as shaking or tapping.

In the case of a larger set of characters, such as an alphabet, other features may be necessary to help with the selection of the characters. In this case the character selection list or array may associate multiple characters with each selectable element. For example, devices with numeric keypads commonly associate multiple alphabet characters with each number key. Currently, the user may press the number keys, and an automated function will attempt to determine which of the multiple associated characters was intended. Similarly, the auto-complete function may be used to reduce the number of characters presented to the user, making it easier to use motion sensing to select the desired symbol.

Discrete gestures and gesture recognition can also be used to input characters or other symbols. In one example, the characters can be presented in an displayed array such that shaking the device in the direction of a particular character selects that character. In another example, a gesture associated with a character could be performed and recognized by the device. For example, the gesture may be a trajectory traced out that resembles the character; alternatively, it may be a different trajectory that is chosen because it is easy to execute and easy to recognize. In some embodiments, a character can be selected by moving the device in space to trace out a trajectory in space representing the character itself, examples of which are described in copending U.S. patent application Ser. No. 12/252,322. The trajectory can be similarly-shaped to the character, or it can be one of a set of trajectories stored in a database and associated with particular characters, these trajectories not necessarily being visually similar to the characters, but being easy to execute and recognize.

In one example of a character gesture, the gesture can include multiple strokes, similar to the multiple strokes in some characters. A motion sensing device as described herein may have difficulty in precisely measuring multiple strokes, since the strokes may overlap when traced in the air or be otherwise misaligned. Thus, unlike character recognized based on stylus motion on a tablet, the spatial relationship between multiple strokes may not be reliably sensed. This can be alleviated in some embodiments by having a control for the user to indicate the beginning and/or ending of particular strokes in a character. For example, one stroke can be input by tracing the device in the air, and then a button pushed or other control activated to indicate the end of that stroke and/or the beginning of another, separate stroke. Another control can be used to indicate that all the character strokes are completed. The device can then read each stroke independently and look at their order, size, etc. and attempt to recognize the strokes as a single character. The spatial relationship between the multiple strokes can be ignored or reduced in significance in the recognition method.

The auto-complete function may operate differently with different languages. In the case of Chinese characters, for example, a series of strokes are performed in order to enter a character. As the strokes are performed as motion trajectories, the auto-complete function could determine the likely intended character based on the strokes that have been entered. An auto-complete menu listing the likely characters could be updated automatically as strokes are entered, and when the desired character appears on the list, the user could navigate to that character using previously discussed techniques. In order to clarify whether a movement corresponds to a stroke, or to moving between strokes, each stroke could be associated with a button press. The button can be pressed before initiating the stroke, and released at the end of the stroke; alternatively, the button can be pressed at any time during the stroke, in order to allow faster stroke delivery. In another embodiment, the strokes could be delivered without any button press. This would make exact character recognition more difficult for the device, but inaccurate recognition would be compensated for by the auto-complete list, which can display all possible characters.

In another embodiment, the auto-complete list or array can be displayed as part of the character list. For example, as the auto-complete function determines which characters or strokes can be entered in order to complete the contact entry (e.g., number, word, or Chinese character), the presented list or array of selectable characters could change form in order to present only the available characters determined to complete the entry. This would allow the number of characters presented to the user to be reduced dynamically.

3-D Map Viewing

Figure 5A:
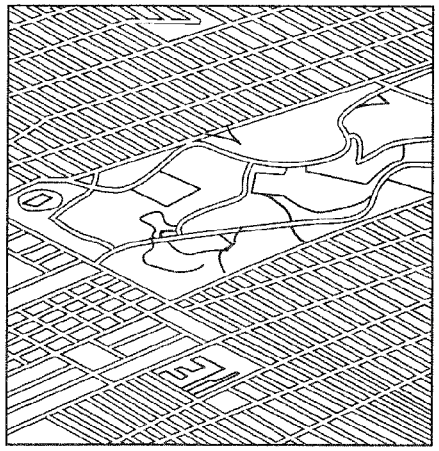
FIGS. 5A-5D are diagrammatic illustrations of manipulation of a displayed map using device motion.
Figure 5B:
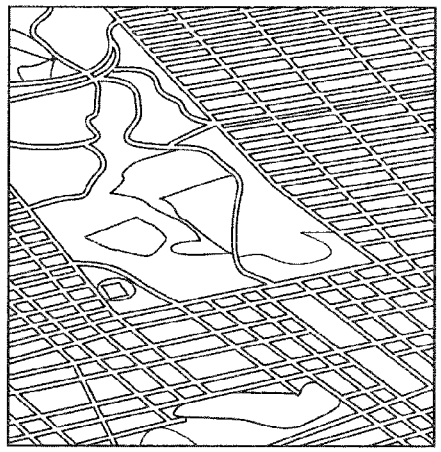

A map viewer application can be used on the device 10 to display images of maps of different areas on the display screen, or landscapes or other representations of physical space. The displayed view for the map can be moved in accordance with motion of the device. For example, the map viewer can provide the panning and zooming of a map similarly as described above. In addition, the map viewer can determine the compass directions on the map from a heading determined by motion sensors of the device 10. The heading can be determined from any combination of gyroscopes, compass, or GPS, for example. Thus, in some embodiments a displayed map can be rotated on the display screen based on this heading in order to correctly align the displayed map with the actual directions on the surface of the Earth. For example, in FIG. 5A the map image is displayed in one orientation based on current user direction, and in FIG. 5B the map orientation has been changed after the user holding the device has moved and faced a new direction.

Figure 5C:
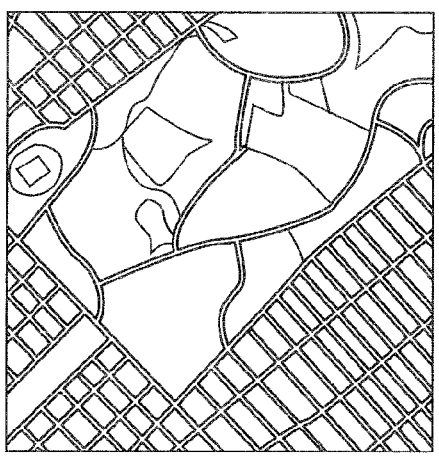
Figure 5D:
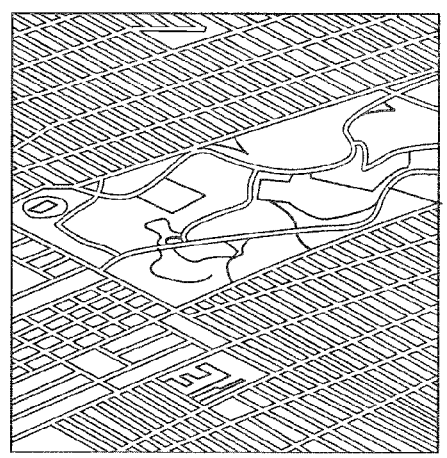

In some embodiments, a 3-D map may also be tilted in accordance with device motion in order to provide a first-person view of the map. Some embodiments may allow such a map to be viewed in first-person view and overhead view. For example, if the device is oriented such that the display screen is horizontal with respect to the ground (i.e., the screen is facing up), the map may be displayed such that the user has an overhead view of the map's area, as shown in FIG. 5C. If the device is moved or oriented such that the screen is vertical (perpendicular to the ground), the displayed map may be continuously moved in accordance with the movement to the vertical position such that the user now has a 3-D view, e.g., where a horizon is shown above the map. One example of a more foreshortened, 3-D view of the map is shown in FIG. 5D; other embodiments can provide a view closer to ground, with a horizon shown and/or taller features of the landscape rising above other features in a 3-D presentation. This tilting and rotating may be continuously controlled, e.g., without the use of any button or other control. Alternatively, it may be controlled using one or more buttons.

Continuous Scrolling

Figure 6A:
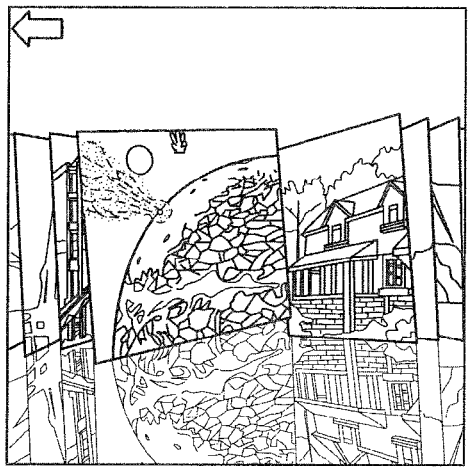
FIGS. 6A-6B are diagrammatic illustrations of scrolling displayed elements using device motion.
Figure 6B:
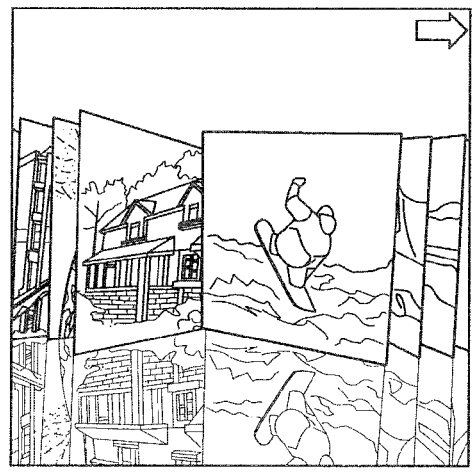

Device motion can be used to scroll the display of different elements on the screen. For example, a horizontally-displayed and aligned set of elements may be displayed on the screen to the user and stored in memory of the device, such as the pictures shown in FIG. 6A. In one embodiment, when a button is held down and the device moved or oriented in space appropriately, the set of elements scrolls continuously in one direction. Thus, in FIG. 6B, the images have been scrolled to the left so that pictures on the right are now in view. In this example, the direction and the speed of the scrolling may be modified by rotating the device.

In some embodiments, gravity is used to determine the direction and speed of the scrolling. For example, if the device is held level, no scrolling occurs. If the device is tilted (rotated) to the left (e.g., yaw motion), the displayed elements are scrolled to the left, giving the impression that the elements are sliding down under the influence of gravity. The speed of the sliding can be determined based on an angle of the device relative to the vertical direction (as determined from the gravity vector); the further the device is tilted, the faster the elements are displayed to scroll. Similarly, if the device is tilted to the right, the elements slide to the right.

The gravity vector can primarily be determined by one or more accelerometers of the device 10. To improve the responsiveness of the system if the orientation is changed rapidly, gyroscope data is combined with the accelerometer data. In one embodiment, the gyroscope and accelerometer data are combined to form a rotation matrix indicating the orientation of the device. Three elements within the rotation matrix will represent a unit vector indicating the direction of gravity. One, two, or all three of these elements may be used to determine the direction and magnitude of the scrolling.

In another embodiment, instead of using gravity as a reference, the orientation of the device immediately before pressing the button is used as the reference. In this embodiment, the illusion of "sliding under gravity" is weakened because the rotation applied may be relative to gravity or not, depending on the orientation of the device prior to pressing the button. However, an advantage is that the user is not required to hold the device upright relative to gravity in order to manipulate a display such as a set of elements.

Processing Sensor Data Based on Device Context

Sensor data from the device sensors can be interpreted by processors on the device in different ways depending on a current device context. This can allow device motions that might be difficult to interpret to be recognized more robustly. Several embodiments of this feature are described below.

Tilt and Tap

Figure 7A:
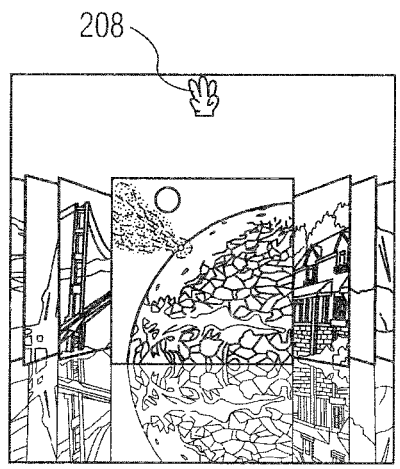
FIGS. 7A-7C are diagrammatic illustrations of motion gesture use with manipulation of displayed elements using device motion.

The device may be manipulated by the user to scroll the display of elements in other ways. As shown in FIG. 7A, in one embodiment, a set of elements such as pictures may be arranged horizontally on the display, with one element being highlighted, e.g., displayed in the largest size of the elements as the focus of the display as shown in FIG. 7A (some unhighlighted elements can partially shown, reduced in size, or otherwise displayed to the sides of the highlighted element for user reference, as shown). A tap motion gesture can be input to the device to influence the display, where a tap gesture is a short pulse of movement of the device, typically caused by the user briefly tapping or hitting the housing of the device with a finger, hand, or object. For example, tapping the device (inputting a tap gesture) can cause the next element in the sequence of elements to be highlighted and the former element to be unhighlighted, i.e., increment the displayed element. The direction of the incrementing may be modified by tilting (rotating) the device in either direction about one or more predetermined axes. For example, if the device is held upright, the tap gesture may not cause any change. However, if the device is tilted to the left about the yaw axis, the tapping causes the set of elements to move to the left on the display such that the next element to the right is highlighted, as though the elements are sliding under gravity. Similarly, tilting the device to the right and inputting a tapping gesture causes the set of elements to move to the right.

In this example, the context of the device includes the element displaying program running. Furthermore, the context includes the physical orientation of the device. Thus, when the device is tilting in a particular direction, and then the user inputs a tapping gesture, this gesture is interpreted in light of the tilting context to mean to scroll the elements in the direction of the tilt.

Figure 7B:
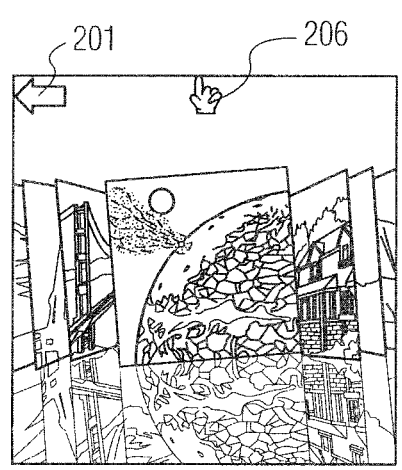
Figure 7C:
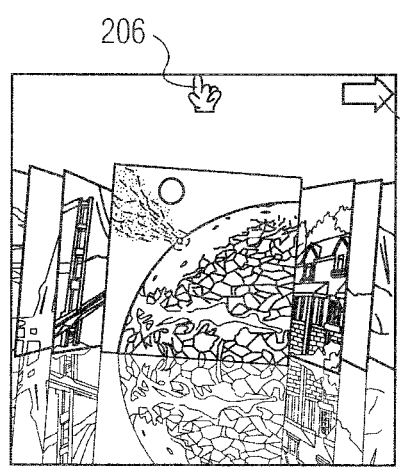

Visual feedback on the display screen may be used to indicate at least one suitable motion gesture that is appropriate for the current operation context. For example, visual feedback in the example above can indicate to the user which direction, if any, the elements will move when a tapping gesture is input. This is shown in FIGS. 7B and 7C. For example, if the device is held upright, no visual indication appears. If the device is tilted to the left, a left arrow 201 can be displayed, as shown in FIG. 7B. If it is tilted to the right, a right arrow 202 can be displayed, as shown in FIG. 7C. The arrows indicate the direction of scrolling when a tap motion gesture is input. In another embodiment, the images themselves may be displayed to tilt slightly in a particular direction based on device tilt, to indicate which one of multiple directions the images will move in if commanded to move.

In another embodiment, instead of using a static (continuous) or simple discrete device movement/orientation gesture to determine the direction that the elements will move, a more complex discrete gesture may modify the direction. In one example, shaking the device to the left may cause the scrolling context and the left arrow to be displayed; then, a tap gesture may be input by the user to increment the displayed elements to the left.

The embodiments described above can be applied to a set of images displayed in a list or array of thumbnail images as shown. In other embodiments, similar control methods can be applied to images displayed in a "full screen" mode, e.g., images occupying the entire display screen.

Double or Triple Tap to Select

If a set of elements is displayed such that motion sensing is used to determine which element is highlighted, multiple tap gestures may be used to select the highlighted element. In some embodiments, multiple taps may be required because single taps may register false positives due to the user adjusting his or her grip on the device. In some embodiments, each tap in a multiple-tap gesture must follow the previous tap within a predetermined amount of time.

In embodiments in which single taps and multiple taps are recognized by the device 10, orientation of the device 10 may be used as a context constraint to determine whether single taps or multiple taps will trigger a function. For example, in one embodiment, if single taps are used to increment a set of elements, but only when the device is tilted, then double or triple taps may be used to select the highlighted element, but only when the device is not tilted.

Visual feedback may be used to indicate the gesture(s) that can be accepted in the current context, and/or what function(s) the gesture will cause to be performed. For example, the visual feedback can indicate whether single or multiple taps (or other gestures) are available to be input by the user to the device, and whether these taps are being recognized (registering) on the device. As shown in FIGS. 7B and 7C, an icon 206 showing a hand with one finger up may indicate that single taps are available to be input in the current operation context. As shown in FIG. 7A, an icon 208 showing a hand with three fingers may indicate that a triple tap is available to be input. Additional feedback may include a counter that displays or flashes a number each time a tap is recognized by the device. For example, as a user taps three times, the counter may briefly display a corresponding number "1," "2," or "3," corresponding to the place of the tap in the sequence. Such feedback is important for helping the user unconsciously learn how to tap correctly. For example, if a triple tap does not register because the orientation of the device was incorrect, the user will know because the three-fingered icon was not present during the tapping. However, if a triple tap does not register because the user did not tap hard enough, the user will know because the displayed number did not reach "3." Without such feedback, the user may not know how to modify the tapping in order to correctly trigger the desired device function or event.

Motion Gesture Shortcuts

Motion gestures can also be used as shortcuts to directly trigger or initiate one or more functions of the device 10 when the device recognizes the input gestures, without having to select icons or other displayed elements or perform other display-related manipulations on the display screen. For example, shortcut gestures can be used to start a particular application, change modes within an application, activate a function of the device (e.g., a function of an application, such as calling a preprogrammed telephone number or starting playback of a media file), or generate other events.

An example of a gesture shortcut is shaking the device. Three different shaking gestures can include shaking the device with rolling, pitching, and yawing rotations. In some embodiments, to ensure that shaking of the device does not trigger functions accidentally, three "shakes" of the device may be required in order to trigger a function. The shaking movement may be primarily derived from gyroscope sensor data; however, in cases in which the rotation inertia varies from one axis to another, acceleration data may also be used to determine the shaking gesture. For example, with a typical handheld device, a roll motion may have a very low rotational inertia (e.g., from rotating the user's forearm), whereas yaw and pitch rotations may have higher rotational inertia (such as bending at the user's wrist or elbow), and thus the rolling motion can be much easier for a user to perform that the other rotations. The sensed rolling angular velocity of the device can therefore be very high, even in cases in which yaw or pitch motion was intended to be the user's primary type of rotation. Thus it may be ambiguous which motion was the primary intended one by the user.

However, the linear acceleration of the motion can be used to determine that a much larger amount of energy was expended in the yaw or pitch directions. For example, when the device is only rotated, and no acceleration is detected, then the axis of rotation (roll, pitch, or yaw) is directly known. In many cases, such rotation without acceleration is roll movement (or a rotation around the device axis corresponding to wrist rotation), since the user can rotate his or her wrist easily without causing other arm movements that cause linear acceleration; such roll movement is often detected in many performed gestures. However, to perform yaw or pitch rotation, the user may have to move his or her elbow or arm, which causes linear motion and acceleration of the device. This acceleration can be used as a "tiebreaker" to determine the intended motion if sensed accelerations around different axes are both detected at the same time. Yaw and pitch rotation may often have a smaller angular velocity than roll rotation, but are correlated with linear acceleration. For example, if roll and yaw rotation are sensed at same time, and there was also sensed a linear acceleration correlated with yaw rotation (e.g., along the yaw axis) and at the same time as the yaw rotation, then the intended movement is most likely yaw rotation and can be recognized as such. A threshold amount of such linear acceleration can be used to detect such motion as yaw or pitch rotation. Thus a yaw or pitch rotation can be determined as the primary motion intended, if it is known previously that the rotational inertia is larger for those rotations compared to other rotations, and that a particular linear acceleration is often a component of those rotations. Similarly, angular velocities in certain axes (such as roll) can be assigned much higher thresholds (speed and/or angle of movement) to be recognized as part of a gesture than thresholds for angular velocities in other axes, if it is known that the motions in the certain axes are typically (or measured and found to be) much easier to perform for a user.

Other types of gestures may include approximately circular movements of the device, or drawing characters in space by tracing the characters out by moving the device, such as letters, numbers, or other symbols. These gestures can also be used as shortcuts to directly trigger a function of the device. In some embodiments, character gesture shortcuts can be interpreted similar to keyboard shortcuts. For example, tracing out a "W" in space with the device can command that a web browser application be launched, if pressing a "W" button of the device initiates the same application.

Constraining Gestures

To allow motion gesture shortcuts to be recognized more robustly and reduce recognition of unintended motions, shortcuts can be configured to be recognized only under one or more predetermined operating contexts of the device. For example, to ensure that a detected motion was intended as a motion gesture and was not incidental or accidental user motion, a particular orientation of the device may be required as a context for a particular gesture input to constrain the gesture recognition system and allow gestures to be recognized more robustly. Thus, a particular gesture will only be recognized as that gesture when the device is oriented in a predetermined way associated with the gesture. In other words, the gesture includes a particular, predetermined orientation of the device in its requirements to be recognized as that gesture, where that orientation is required before, during, and/or after the performance of the gesture. In some embodiments, the predetermined orientation is required only during a predetermined amount of time measured from the beginning of the gesture. In other embodiments, the predetermined orientation is required during the performance of the entire gesture. In still other embodiments, the predetermined orientation is only required right after the gesture is completed, e.g., once the gesture is detected and recognized, the current orientation of the device is immediately checked. The device orientation need only approximately match the predetermined orientation, e.g., the device need only be within a specified angle range or movement range of the predetermined orientation.

As an example, a "return" gesture can command the device to return to and display a main menu or default menu of the device 10, regardless of the current mode or application currently being displayed. For example, this return gesture can be a shake gesture, and can also require that the device be oriented, before/during the shake gesture, such that the screen of the device is pointing downward. For example, the gesture can be a shaking of the device three times (as though dumping something out of the screen). Requiring that the screen must be pointing downward makes it less likely that this gesture will be recognized accidentally when the device is being shaken for some other reason.

In another embodiment, a shake gesture may be used to start an application from a main menu. Three shakes in a roll axis may be used to start one application, such as a web browser, while three shakes in a pitch axis may be used to start another application, such as a camera. To ensure that these applications are not triggered accidentally by other shaking motions of the device, the system can require the user to hold the device horizontally (e.g., screen horizontal) to recognize either these gestures, if the device is normally or primarily held vertically (e.g., screen vertical). (In some embodiments, the system can be user-specific and determine how the device is normally held by a particular user by examining orientation data stored over a previous time period of use.) Since the device is primarily held vertically, the gestures requiring a horizontal orientation will not be recognized during ordinary operation.

In another embodiment, a button 36 may be used to initiate a particular operating context of the device and determine when the gesture should be recognized. For example, the user may press and release the button without holding the button, and then execute a gesture. Alternatively, the user may press and hold the button and then execute the gesture while the button is held. This method would add robustness, as it would prevent the system from recognizing unconscious movements as gestures.

Phone Application

In some embodiments, certain gestures may only trigger an event when the device is in a context that is a certain operating mode. For example, a cell phone or other telephone functionality can be provided in the device 10, providing a telephone mode. In one phone embodiment, ordinarily a yaw shaking movement will not be recognized as any gesture and will not trigger any functions of the device. However, if there is an incoming call, phone mode is entered and a yaw shaking movement can be input to answer the call. A similar gesture may be used to end the call or hang up the phone. During the call, a triple tap gesture, or other gesture, may be input to toggle (enable and disable) a speaker phone function.

Portrait and Landscape Viewing Features

Accelerometers can be used in handheld devices to switch an orientation of a displayed image or application between portrait and landscape modes of the screen. The standard methods for performing this function do not work well if the screen of the device is oriented approximately horizontally, i.e., the screen of the device is pointing primarily upwards or downwards. This is because accelerometers cannot detect rotation around the gravitational vector, but only measure orientation relative to gravity.

In the present invention, a yaw gyroscope can be used to control portrait and landscape orientation in this case or horizontal screen orientation. The gyroscope signal is integrated; when the signal passes a threshold indicating a 90 degree rotation, the image shown on the screen is rotated in the opposite direction by 90 degrees. The threshold may be less than 90 degrees in some embodiments. A rotation through a specific angle may be required, or a yaw rotation gesture may be used instead. If a rotation occurs that is large enough to pass the threshold, the image is rotated on the screen (e.g., 90 degrees). If a specific angle is required for the threshold, 90 degrees may be subtracted from the current angle, and the integration may continue. This allows the user to rotate the device by more than 90 degrees. For example, if the user rotates the device 180 degrees, the image is rotated 180 degrees.

To ensure that the image does not rotate unexpectedly, this integration may only occur when the screen of the device is close to horizontal. In some embodiments, device rotation above a certain speed may be required; if device rotation occurs under that speed, the image is not rotated on the display. This also allows the user to control whether image rotation occurs or not; if the device is rotated quickly, image rotation occurs; otherwise, it does not.

The image rotation may be constrained to occur within a predetermined time, i.e., only when the device is rotated over the threshold angle within the predetermined time period. For example, if the user only rotates the device 45 degrees and then stops the rotation, the angle may be set back to zero after the predetermined time, or may gradually leak back to zero at a predetermined rate after the predetermined time has expired.

Visual feedback may be used to help the user learn to control the rotation, and understand why the rotation did or did not register in some cases. The current angle of integration may be directly mapped to the image on the screen, modified with some scale factor. The user will see that a certain kind of rotation causes the image to respond, and another kind of rotation does not. If a 45 degree rotation occurs, and the integral is leaking back to 0, this will be directly observable by the user in such visual feedback.

Figure 8A:
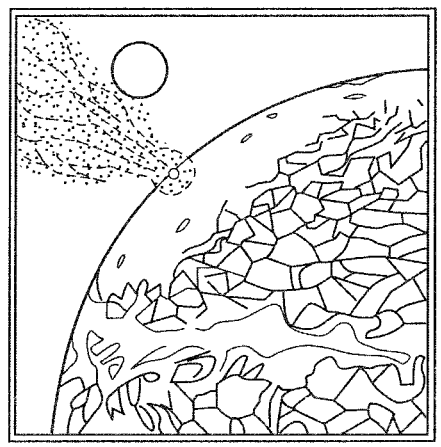
FIGS. 8A-8C are diagrammatic illustrations of displayed image rotation to indicate how the image display will change based on device motion.
Figure 8B:
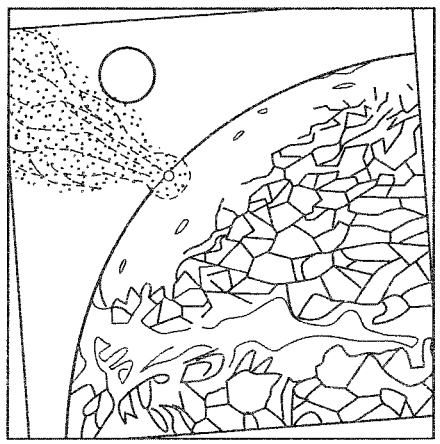
Figure 8C:
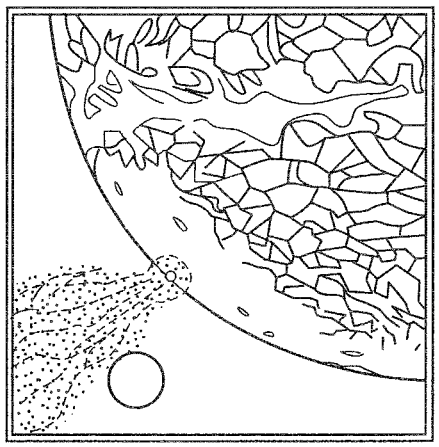

In some embodiments, an image can be slightly rotated during device rotation to indicate how it would rotate if the angle threshold were reached. For example, in FIG. 8A, an image is displayed. In response to the user rotating the device an angle under the associated angular threshold, and if the rotation speed is above a predetermined speed threshold, then the image is displayed with a minor rotation in the corresponding direction, as shown in FIG. 8B. This indicates to the user the direction and type of image change that will result with the full angle rotation. When the rotation is below the speed threshold, then the image is not rotated at all (neither the minor rotation, nor the full rotation). In FIG. 8C, the image has been rotated a full 90 degrees once the user rotation of the device is over the associated threshold.

Audio and Vibration Feedback

In some cases, the user may not be able to see the display screen, or may not wish to see the screen. For example, in a previously mentioned embodiment in which the screen is oriented face down before shaking in order to return to the main menu, the user would not know whether the gesture worked or not since the screen is typically not visible with the device facing down. Therefore, the device can respond with audio or vibration feedback, such as a particular audio beep indicating a return to the main menu. In the embodiment in which the user is answering the phone by shaking the device, it may be desirable to answer the phone without looking at the screen first. In this case, vibration and/or audio feedback may be useful to indicate that a shake gesture has been recognized and the phone call has been answered and is receiving a voice from the call. In general, in cases in which gestures are performed in which the user does not want to see the screen, or cannot see the screen due to the nature of the gesture, vibration or audio feedback will help notify the user that the gesture was recognized. The type of vibration or audio feedback may help determine which gesture was recognized, so that the user will know whether the gesture was recognized correctly or not. Audio can be provided using well-known speaker devices and vibration provided at least one vibration motor or actuator, included in the motion sensing device.

Authentication Applications

More advanced gesture algorithms can be used for the purpose of authentication. For example, a device motion executed by the user can be analyzed and compared to a motion stored in a database. If the executed motion matches the stored motion, the user is authenticated. For example, the user may need to be authenticated to gain access to information, an item, an account, a device function, a function of a device in communication with the device 10, etc. Such motion authentication can have several advantages, including, for example, the preference and ease of some users in remembering a motion signature or authentication motion over other types of signatures, such as passwords or codes.

Matching the executed motion to the stored motion can be performed in various ways. The executed motion may be matched directly to the stored motion, or may be transformed first using coordinate transforms and previously described sensor fusion algorithms, and reduced to its most important gesture features before matching (motion gesture features are described in copending U.S. patent application Ser. No. 12/252,322, and are incorporated herein by reference). The user can record the stored motion beforehand one or more times by simply executing it, and this recorded motion becomes the stored motion to which to compare later motions.

Alternatively, the executed motion can be recorded but not matched; in this case, the user or a court of law can be responsible for determining at a later date whether the motion was correct or not. For example, authentication systems that currently use written signatures do not depend on machines to verify the authenticity of the signature. The signature is stored later compared by people to other signatures. Similarly, the executed motion can be stored and compared by people to other motions. The motion can be stored and viewed as a 3-dimensional motion, for example, the rotation and translation of a 3D object. Alternatively, it can be stored as a 2-D motion similar to a signature; in this case, the motion can be that of a trajectory traced out in the air. In such implementations, the movement of a device could be transposed into a tangible authentication mark that could be directly correlated with a particular user and could be used to identify the user for a variety of purposes, including for legal and commercial purposes (e.g., having the legal value of a traditional signature, authorizing a purchase in a commercial setting, etc.).

In one application, a device motion can be used to authenticate an event or access associated with an external system that is ordinarily authenticated by some other means, such as a signature, card swipe, key, magnetic strip, or RFID (Radio Frequency Identification) chip. The authentication can be executed as a motion by the user and matched to a previously recorded authentication in a database. In some embodiments, this motion can be combined with another authentication mechanism, such as an RF signature, to provide the authentication. In another example, a user may define the motion to be used when unlocking an external system. The user could program the system by simply doing the motion with the handheld device one or more times; later, that same motion could be used to unlock the external system. For example, the authentication motion can be used to unlock an external system such as a car door and/or car ignition. In such implementations, the handheld device could communicate with the external system being controlled via one or more local communication channels (e.g., WiFi network, direct wireless communication, infrared communication, audio communication, etc.), via a network (e.g., both the handheld device and the external device are connected directly or indirectly to a network), or via a combination of one or more local communication channels and a network.

In another example, a device (such as a card) including an RFID or other RF chip can be used to make a purchase by swiping the device past an RF detector. However, if the device has been stolen, additional motion authentication can be made necessary such that a court could prove that the purchase was invalid. For example, a predetermined authentication motion could be made by the user while holding the device near the RFID reader. The purchase could thus be authenticated with very little extra time required by the user.

Health Applications

Motion sensors of the device 10, such as gyroscopes and accelerometers, can be used to measure human movement in order to measure and encourage physical activity necessary for a healthy lifestyle.

In one embodiment, accelerometers may be used with or without gyroscopes and GPS as a pedometer, to measure the spiking impact movements associated with stepping (walking, running, etc.). Step counters can be used to determine how many calories a user has burned and the approximate distance traveled. With the addition of GPS, step length and distance traveled can be determined in order to make a better assessment of the calories burned, route traveled, and distance traveled.

In addition to measuring steps, more precise measurements of energy expenditure can be made using both gyroscopes and accelerometers. For example, if the device is placed in the user's pocket, the angular velocity of the user's leg swinging can be measured by the device in order to assess the amount of energy expended. The difference between ordinary walking and "speed walking," for example, cannot be determined by counting steps, but may be determined by measuring the energy used when measuring limb movement.

In some embodiments, a user's ambient movement can be measured to determine how much energy the user is expending in ordinary daily life. For example, if a doctor or sports practitioner requires a user to move around a certain amount, the motion sensors can be used to record and quantify the amount of movement executed by the user. Near the end of the day, the user may examine this amount of movement, and then execute some other movement in order to meet the required quota of exercise. The system recording and quantifying the user's movement may also issue reminders or encouragement to the user in order to move or continue.

In another embodiment, the motion sensors can be paired with an exercise system that instructs the user to perform certain exercises. In addition to instructing the user to do certain exercises, and displaying the correct exercise on a display in some embodiments, the motion sensors may also be used to determine when the user is actually executing the exercise. As an example, the exercise system may instruct the user to perform 30 sit-ups. The user would be required to hold the device 10 and perform the sit-ups. The motion sensors can record the motion and determine when the exercise is being performed by the user. In one embodiment, the device can count out loud via an audio speaker as the user performs a repetitive exercise such as sit-ups, and deliver encouraging words as the user performs them. If the motion sensors determine that the user is slowing down, or has stopped the exercise, the device could deliver increased encouragement in order to convince the user to complete the exercise. A variety of exercises can be performed by the user while the device is held, and in each case the device can measure the movement in order to synchronize with the user, and evaluate the user's movement in order to give feedback on the speed of execution or the form. For example, in the case of push ups exercise, the handheld device can measure both speed and arm movement, determining if the user's arms are back to the starting position or not.

In a different health application, the device can use its motion sensors to help determine if the user has had a medical emergency. In one example, using the motion sensors the device can detect whether the user has suddenly and quickly fallen from a standing or sitting position to a prone position, indicating a possible medical emergency. The device can be programmed to automatically notify an emergency service, ambulance, or doctor if such an emergency is detected, as well as indicate the current user's location if such functionality is available in the device. The user can adjust settings of the device tailored to his or her medical condition to allow different sensitivities for emergencies. In another application, a similar emergency feature can be provided when the device detects a sudden fall or dangerous motion during a sport movement or exercise.

Sports Applications

In one embodiment, the motion sensors of the device 10 can be used to evaluate sports activity. The device can be held in the user's hand, or placed elsewhere on the user, e.g., mounted on some other part of the user's body such as a belt, shirt, or ankle, or placed in the user's pocket. The device can measure movement associated with a sports activity, and record and analyze the movement in order to provide feedback for the user. The device may also be mounted on a golf club, baseball bat, tennis racquet, boxing glove, or other piece of sports equipment.

In order to provide the most detailed signal, high sample rates and high full scale ranges can be used. In one embodiment, a sample rate of 1 kHz can be used in order to provide detailed data describing a very fast movement, such as a golf swing. Since this is a very fast rate of data recording, the data recorded may normally be only 100 Hz or 200 Hz of data unless the user is detected as performing a very high energy movement, in which case all the 1 kHz data is recorded. In another embodiment, in which only a casual sports analysis is necessary, the entire data rate may always be lower, such as 100 Hz or 200 Hz.

Gyroscope and accelerometer data can both be recorded, along with other sensor data if it is available, such as compass data. The sensor data available can be passed through a sensor fusion algorithm in order to derive the most useful physical parameters, such as rotation matrix and linear acceleration. The data recorded and processed may be mapped to a 3D model in order to give the user a view of the motion performed during training.

The motion may also be matched to prerecorded motion performed by professional athletes, in order to determine if the motion was performed correctly. In some embodiments, such matching can be accomplished using algorithmic methods currently used for voice recognition. The matching can be performed using raw data, but may also be performed using processed data at the output of the sensor fusion algorithm, such that useful physical parameters are being matched rather than raw data. After matching, thresholds in timing or amplitude can be used to determine how the user's movement is different than the professional athlete's movement.

Gaming Applications

Handheld gaming systems can be improved with the user of gyroscopes and accelerometers. While accelerometers exist in some handheld gaming devices, gyroscopes can be added in order to decrease the latency of detected continuous movement, and increase the richness of gestures that can be used with the gaming systems.

In one embodiment, the gyroscopes and accelerometers can be combined in a sensor fusion algorithm in order to provide a rotation matrix, quaternion, or Euler angle representation of the devices orientation in space. This orientation can be mapped directly or with constraints to a virtual world shown in the display of the device. For example, orienting the device differently can provide the user with a different view of the virtual world. Linear acceleration can be extracted in order to provide a representation of the linear movement of the device in space. Transient linear movements can also be applied to physical gaming models displayed in the device. Sensor fusion algorithms can also blend the inertial sensor data with an on board camera, compass, or other motion sensor.

The element selection techniques previously described that utilize roll, pitch, yaw, or circular device movement, could also be applied to gaming systems, in which the elements to be selected and manipulated can be items within a game. Similarly, the gesture recognition applications described previously can be used to select elements or trigger events within a game system.

In one embodiment, a driving, flying, skiing, or other game involving steering could be controlled using gyroscopes and accelerometers. The sensor fusion algorithm that combines gyroscopes and accelerometer can output a gravity vector that determines which way the direction "down" is, relative to the device. By rotating the device relative to the gravity vector, a steering motion can be used to control a game. While this is possible without gyroscopes, using only accelerometers typically results in a control signal that is either noisy or has high latency, making fast fluid control of a game difficult. Using only gyroscopes provides a low latency signal that is easy to control, but may have drift. Using the output of the sensor fusion algorithm allows the steering signal to be low latency, low noise, and low drift. The steering mechanism does not necessarily need to be relative to gravity, but can be relative to a starting point chosen by the user. For example, when starting the game, the direction of the device held by the user could be recorded and used as a reference for all future movement.

In one embodiment, a 3D game can combine these steering concepts with the virtual world concepts. One or more degrees of freedom can be used as control signals for steering, while one or more degrees of freedom are mapped directly to 3D graphics representing a virtual world. As an example, a flying game can be constructed that uses pitch and yaw in order to steer the vehicle, and roll is mapped directly to rolling the user's field of view.

Discrete gesture recognition can be combined with continuous gesture movement to make the games more interesting. For example, in games that are primarily controlled by steering, discrete gestures can be added in order to perform certain functions. Shaking the device may cause a simulated vehicle to shift gears or perform stunts or tricks, for example.

The sports analysis and training applications previously described can also apply to sports games as performed on mobile devices. In another embodiment, real-time gesture recognition can be used to detect sports related movements in order to allow a user to play a sports game. This gesture recognition would optimally be done on physical parameters output by the sensor fusion algorithm, rather than raw data.

Power Management

The motion sensors in the device may also be used to control the power management of the system. For example, if it is determined from the motion sensors that the device has been stationary for a long time (and the device is not in a dedicated media playing mode or some other active or predicted data processing state) then the device may enter a lower power state such as a sleep mode.

In some cases it may be desirable to save power by power cycling the sensors. For example, this usage can depend on the mode of the device and the state of a motion function trigger button. For example, in the icon selection example, if the button is not depressed, then the motion sensors may be powered down to conserve power. Pressing the button may cause the sensors to power up before motion sensing begins. If some background motion sensing is required, then the motion sensors may be duty cycled when the button is not depressed. For example, when the button is not depressed, the gyroscopes may alternate between being off for 1 second and on for 0.1 seconds. When the button is depressed, the gyroscope may be turned on to full power, and used to control the device. Alternatively, the gyroscope may still be duty cycled when the button is depressed, but at a faster rate than when the button is not pressed; for example, off for 5 ms and on for 5 ms.

Applications using a Motion Function Trigger

As described herein, device motion can be used in combination with input detected from an input control device of the motion sensing device 10. The input control provides an indication for the device to detect gestures during device motion intended by the user for gesture input. For example, one or more buttons, switches (mechanical, optical, magnetic, etc.), knobs, wheels, dials, or other input control devices, all referred to herein as a "motion function trigger" (also denoted "MFT") 36 (as shown in FIG. 2), can be provided on the housing of the motion sensing device 10, which the user can push or otherwise activate. For example, one or more buttons, such as buttons 8 and 9 shown in FIG. 1 on the side of the device for convenient access by the user, can be used as motion function triggers. A hardware control can be used (implemented via a mechanical device, tactile sensor, pressure sensor, capacitance sensor, infrared sensor, proximity sensor, magnetic sensor or any other type of sensor that can detect an external interaction), or a software/displayed control (e.g. a displayed button or control on a touchscreen) can be used as the motion function trigger.

In some embodiments, a combination of motion function triggers could be used to achieve the effects described herein for a single motion function trigger. In some embodiments, the effect of a motion function trigger can be inferred from the way in which a user holds a device, including the pressure placed on the device at various points (which could be determined, for example, via mechanical sensors, capacitance sensors, or other sensors capable of directly or indirectly detecting pressure placed on the surface of a device or screen), the number of fingers placed on the device, the distribution of the grip used to hold the device, and from any other aspects of the physical interaction between a user and a device. In one embodiment, the proximity of a user's hand or body presence to the device can be used to enter into a motion function trigger mode, even in the absence of direct physical contact. In one embodiment, the effect of a motion function trigger can be mapped to a set of movements of the device, including taps, shakes or other gestures. The number of and nature of such movements that trigger the effect of a motion function trigger could be predefined, or could be dynamically inferred based on the then-active application, device context, nature of motion of the device, or any other factors.

The motion function trigger on the device can be used to determine whether the device is in a "motion mode" or not. When the device is in a motion mode, the processor or other controller in the device 10 can allow motion of the device to be detected to modify the state of the device, e.g., detected as a gesture. For example, when the motion function trigger is in its inactive state, e.g., when not activated and held by the user, the user moves the device naturally without modifying the state of the device. However, while the motion function trigger is activated by the user, the device is moved to modify one or more states of the device. The modification of states of the device can be the selection of a function and/or the execution or activation of a function or program. For example, a function can be performed on the device in response to detecting a gesture from motion data receiving while in the motion mode. The device exits the motion mode based on a detected exit event. For example, in this embodiment, the exit event occurs when the motion function trigger is released by the user and the activation signal from the motion function trigger is no longer detected. In some embodiments, the modification of states of the device based on the motion data only occurs after the motion mode has been exited, e.g., after the button is released in this embodiment. When not in the motion mode, the device (e.g. processor or other applicable controller in the device) ignores input sensed motion data for the purposes of motion gesture recognition. In some embodiments, the sensed motion data can still be input and used for other functions or purposes, such as computing a model of the orientation of the device as described previously; or only particular predetermined types of gestures or other motions can still be input and/or recognized, such as a tap gesture which in some embodiments may not function well when used with some embodiments of a motion function trigger. In other embodiments, all sensed motion data is ignored for any purposes when not in motion mode, e.g., the sensors are turned off. For example, the release of the button may cause a detected spike in device motion, but this spike occurs after release of the button and so is ignored.

The operation of a motion mode of the device can be dependent on the operating mode of the device. For example, the activation of a motion function trigger to enter motion mode may be required for the user to input motion gestures while the device is in some operating modes, while in other operating modes of the device, no motion function trigger activation is required. For example, when in an image display operating mode which allows scrolling a set of images or other objects across a display screen 16*a* of the device based on movement of the device, the activation of a motion mode may be required (e.g., by the user holding down the motion function trigger). However, when in a telephone mode in which the user can make or answer cell phone calls, no motion mode activation or motion function trigger activation need be required for the user to input motion gestures to answer the phone call or perform other telephone functions on the device 10. In addition, different operating modes of the device 10 can use the motion function trigger and motion mode in different ways. For example, one operating mode may allow motion mode to be exited only by the user deactivating the motion function trigger, while a different operating mode may allow motion mode to be exited by the user inputting a particular motion gesture.

In some embodiments, the motion function trigger need not be held by the user to activate the motion mode of the device, and/or the exit event is not the release of the motion function trigger. For example, the motion function trigger can be "clicked," i.e., activated (e.g., pressed) and then released immediately, to activate the motion mode that allows device motion to modify one or more states of the device. The device remains in motion mode after the motion function trigger is clicked. A desired predefined exit event can be used to exit the motion mode when detected, so that device motion no longer modifies device states. For example, a particular shake gesture can be detected from the motion data, from motion provided by the user (such as a shake gesture having a predetermined number of shakes) and, when detected, exits motion mode. Other types of gestures can be used in other embodiments to exit the motion mode. In still other embodiments, the exit event is not based on user motion. For example, motion mode can be exited automatically based on other criteria, such as the completion of a detected gesture (when the gesture is detected correctly by the device).

Input Device

The hand-held device 10 can also be used to trace out a trajectory in the air in order to provide input to an external system and act as an input device, where the input is based on the movement or position of the device 10 in the air. The trajectory of the hand-held device 10 can be obtained, for example, by integrating two gyroscopes sensing different axes of the device, such as the pitch and yaw gyroscopes. Alternatively, this trajectory can be obtained from pitch and yaw movement relative to gravity, derived from all the gyroscopes and accelerometers (e.g., three gyroscopes and three accelerometers) at the output of a sensor fusion algorithm (e.g. using model equations such as those described in copending U.S. patent application Ser. No. 12/252,322, incorporated herein by reference). This trajectory can be used in conjunction with existing cursor control software, or with handwriting recognition software that was designed originally for mouse, stylus, or touchscreen applications.

In one embodiment, the trajectory can be wirelessly transmitted to an external device, such as a computer device or electronic entertainment system. The trajectory can be used in conjunction with a button or other control to control a cursor displayed on a display screen that directly controls the PC or entertainment system. Or the trajectory input can control a different displayed object or view on a display screen of the other device.

In another embodiment, the software can run entirely on the handheld device 10 without providing input to another device. The trajectories can be interpreted as characters using existing handwriting recognition software that was designed for stylus or touchscreen devices.

An embodiment of the present invention provides a handheld electronic device that comprises a subsystem providing display capability. The mobile handheld electronic device could be any type of electronic device that can be moved by a user while being held in the user's hand, including device 10 shown in FIG. 2. In some embodiments, the device may be attached to, integrated in, or otherwise physically coupled to an external extension. The extension may be a game instrument (e.g., a tennis racket, baseball bat, golf club, gun or other weapon) suitable for use in a video game context, a pointing device suitable for physical metrology, surveying or similar applications, or any other type of physical device that can benefit from the functionality of the device. The extension itself may be a physical handle with no processing capability of its own, or may have data processing capability that is at least partially complementary or overlapping with the functionality of the device.

In one implementation, the subsystem providing display capability is a display attached to the device. The display may be integrated in the device and substantially immovable relative to the device. In an alternative implementation, the device may be attached to the device and may be extended away from the device, rotated with respect to the device, tilted with respect to the device, or otherwise movable with respect to a portion of the device. Examples of such displays include any cathode ray tube (CRT), storage tube, bistable display, electronic paper, nixie tube display, vector display, flat panel display, vacuum fluorescent display (VF), light-emitting diode (LED) display, ELD display, plasma display panel (PDP), liquid crystal display (LCD), HPA display, thin-film transistor display (TFT), organic light-emitting diode displays (OLED), surface-conduction electron-emitter display (SED), laser display, carbon nanotube display, nanocrystal display, quantum dot-based display, or any combination of the foregoing that could be implemented or otherwise used in connection with a handheld device.

In one embodiment, the subsystem providing display capability includes a set of modules capable of producing an image substantially adapted for display on an external display. The modules could include hardware logic, software logic, or a combination of hardware and software. The image could be any static, dynamic or multimedia signal, including text, pictures and video. Logic for producing images is well known in the art, including video and image signal generation, video and image compression, video and image encoding, and video and image transmission over a variety of wireless or wired media. The image produced by the set of modules may be substantially complete and ready for display on an external display, or may need additional processing prior to being displayed on the external display (e.g., the image may include data output from the device, but may need additional display-specific video signal information that is necessary for proper display on a specific external display).

In one embodiment, the subsystem providing display capability includes a set of modules capable of projecting an image on a screen (e.g., an optical projector system forming a 2D image on a screen, a board, a wall or any other surface capable of displaying an image), or in space (e.g., a 3D or holographic image).

In one implementation, the device further includes a set of motion sensors sensing rotational rate around at least three axes and linear acceleration along at least three axes. In one embodiment, the set of motion sensors sensing rotational rate around at least three axes consists of three sensors, but in other embodiments there can be four, five, six or any other number of such sensors. In one embodiment, the motion sensors sensing rotational rate are gyroscopes. In various embodiments, there may be three, four, five, six, or any other number of gyroscopes.

The motion sensors sensing rotational rate may be implemented using a variety of technologies, including Micro Electro Mechanical Systems, piezoelectric, hemispherical resonator, tuning fork, quartz, carbon nanotubes, any other technology capable of producing devices that can sense motion of a rotational nature, or any combination of the foregoing.

In one embodiment, the set of motion sensors sensing linear acceleration consists of three sensors, but in other embodiments there could be four, five, six or any other number of such sensors. In one embodiment, the motion sensors sensing linear acceleration are accelerometers. In various embodiments, there may be three, four, five, six, or any other number of accelerometers. Accelerometers are widely known in the art and can be implemented using any known accelerometer manufacturing technology, any other technology capable of producing devices capable of sensing acceleration, or any combination of the foregoing.

In one embodiment, the set of motion sensors sensing rotational rate around at least three axes and linear acceleration along at least three axes are integrated in a single module. In one implementation, the module is integrated in a single package, or otherwise enclosed in a single package. The single package module could consist of a single chip, or could include multiple individual devices that are integrated together in a common package. Examples of such multiple individual devices that may be integrated together in a common package include two or more dies that are attached to each other or otherwise integrated together, a printed circuit board (possibly including additional circuitry), a system on a chip (SOC), or any other combination of devices.

Figure 9A:
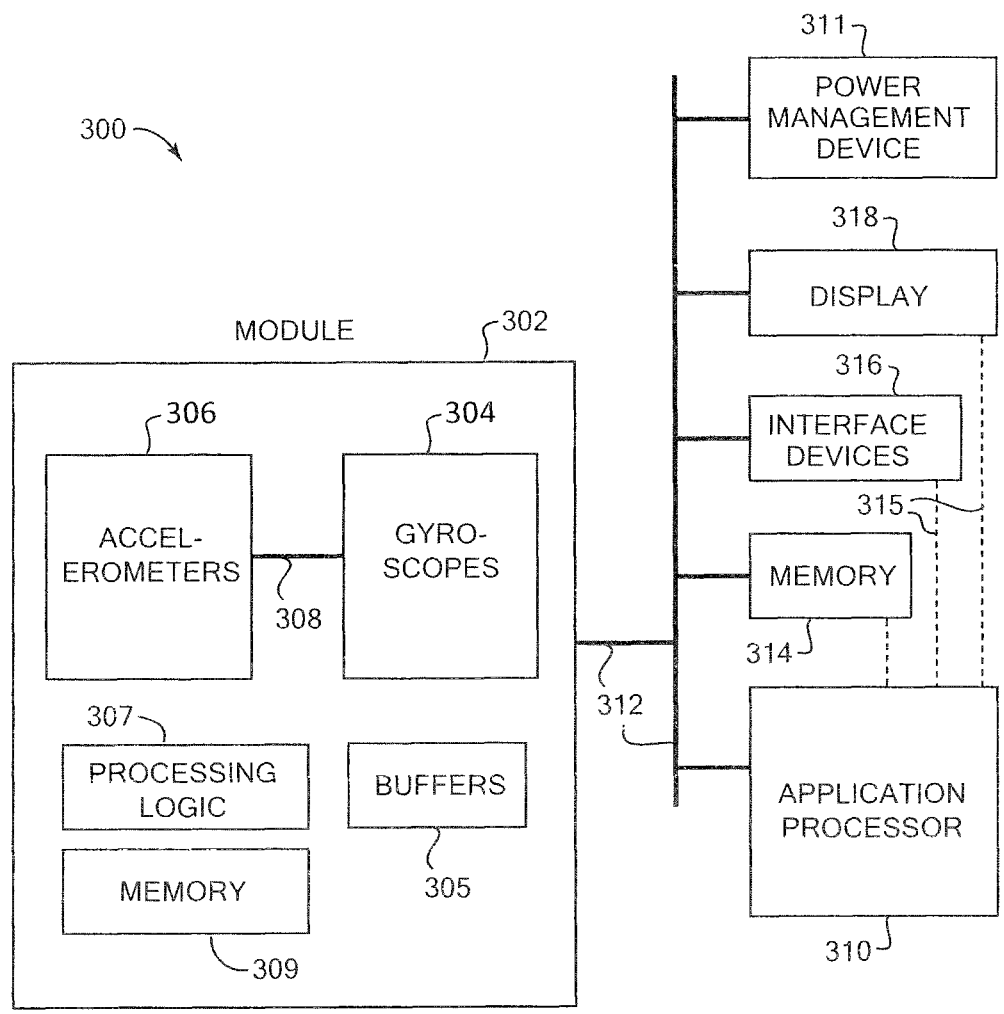
FIGS. 9A-9C are block diagrams illustrating embodiments of a portion of a motion sensing system for a handheld electronic device.

FIG. 9A illustrates a block diagram of one embodiment of a portion 300 of a motion sensing system for a handheld electronic device, including examples of the module and subsystems. In one embodiment, the module 302 comprises a first subsystem 304 that includes the motion sensors sensing rotational rate (shown as gyroscopes in the example of FIG. 9A), and a second subsystem 306 that includes the motion sensors sensing linear acceleration (shown as accelerometers in the example of FIG. 9A). In one implementation, the first subsystem 304 is coupled to the second subsystem 306 via a sub-module data bus 308. The sub-module bus 308 could be a local data bus that facilitates communications between the two subsystems, and between the individual sensors included in the two subsystems. Such communications may include motion data generated by the sensors, instructions for the sensors (e.g., directions to power down for power conservation, directions to power up, directions to adjust operation, etc.), and any other sensor-related data or data relating to the operation or functionality of the subsystems or sensors. The motion data generated by the sensors and transmitted via the sub-module data bus 308 may be preprocessed (i.e., synchronized among the multiple sensors in time) or raw (i.e., raw data could be made available to an external processor for separate processing, whether by itself or in addition to the preprocessed data). In one embodiment, synchronization in time of the motion data produced by any two or more of the sensors is important to ensure that the information received from the sensors is indeed representative of the state of the device and nature of motion at any particular point in time.

The sub-module data bus 308 could be implemented using any wired or wireless communication technology, including electrical transmissions (e.g., serial, parallel, or packet-based communications), optical transmissions (e.g., optical fiber, optical switching matrix, optical free-space transmissions), or wireless transmissions (e.g., ultra-wideband, local wireless network, Bluetooth). The protocols used on the sub-module data bus could include standard protocols (e.g., i2c), or may be a proprietary protocol (possibly encrypted).

In one embodiment, all motion sensors sensing rotational rate are integrated in the first subsystem 304, and all motion sensors sensing linear acceleration are integrated in the second subsystem 306. In alternative embodiments, the module could comprise additional subsystems. In one implementation a first subsystem includes one motion sensor sensing rotational rate, a second subsystem includes at least two motion sensors sensing rotational rate, and a third subsystem includes at least three motion sensors sensing linear acceleration. In alternative embodiments, the at least three motion sensors sensing linear acceleration in the third subsystem could be distributed among two subsystems. In one embodiment, additional subsystems could be added to include additional motion sensors sensing rotational rate, and/or additional motion sensors sensing linear acceleration. In one embodiment, all such subsystems included in the module are connected to a sub-module data bus. In an alternative embodiment, one or more subsystems are not connected directly to the sub-module data bus. For purposes of this description, a subsystem is considered to be connected to the sub-module data bus even though buffers or other circuitry may be interposed between the subsystem and the sub-module data bus, as long as the subsystem is capable of sending and receiving data via the sub-module data bus to another device connected to the sub-module data bus (as opposed to having to route such data via an external data bus to the device).

In one embodiment, the module (e.g., module 302) that includes the set of motion sensors is capable of substantially synchronizing in time motion data produced by some or all sensors. In one embodiment, the module buffers such motion data, e.g. using buffers 305 in the module, and makes it available to any other device that may utilize the data. Examples of such other devices can include an external processor or an external application, such as application processor 310 and/or an application running on that processor. In one embodiment, the module includes data processing logic 307 (whether hardware, software, firmware or a combination of the foregoing) that can processes internally the motion data produced by the motion sensors, thereby possibly reducing processing requirements outside the module. The logic 307 can use memory 309 internal or external to the logic for the processing, in some embodiments. In various implementations, the module may further include one or more processors, DSPs, memory, and any other circuitry. The data processing logic 307 and/or other processing components can be included in one or more of the sensor subsystems, or partially or completely provided elsewhere in the module 302 outside the sensor subsystems and connected via appropriate buses to the subsystems and/or to the external bus(es) 312.

In one embodiment, the module 302 is coupled to one or more external device buses 312, which facilitate communications between the module and external devices to the module, such as other components of the handheld device. One example is shown in FIG. 9A, where an application processor 310 is connected to an external device bus 312. For some types of external devices buses, devices such as power management device 311 and/or other peripheral devices can be connected. In some embodiments, memory 314, interface devices 316 (input and/or output devices, circuits, and/or components), and a display 318 are some of examples of components of the handheld device that can communicate over the external device bus 312. In some embodiments, particular devices may alternatively, or additionally, have their own dedicated buses to the application processor 310 or other components, such as buses 315 shown as dashed lines in FIG. 9A to components such as a display 318 and memory 314, or a separate bus as shown in FIG. 2. In some embodiments, some of the depicted connections may not be present (e.g., the application processor 310 may connect to a component via the shared external bus 312, via a separate bus, or via a combination of shared and separate buses). One example of an external device bus is a bus according to the I2C standard, but any other type or standard of communication bus can alternatively or additionally be used. In one embodiment of FIG. 9A, the subsystems 304 and 306, and the sub-module bus 308 are isolated from the external device bus 312, and may communicate with the external device bus only via other components such as processing logic 307 or other component.

Figure 9B:
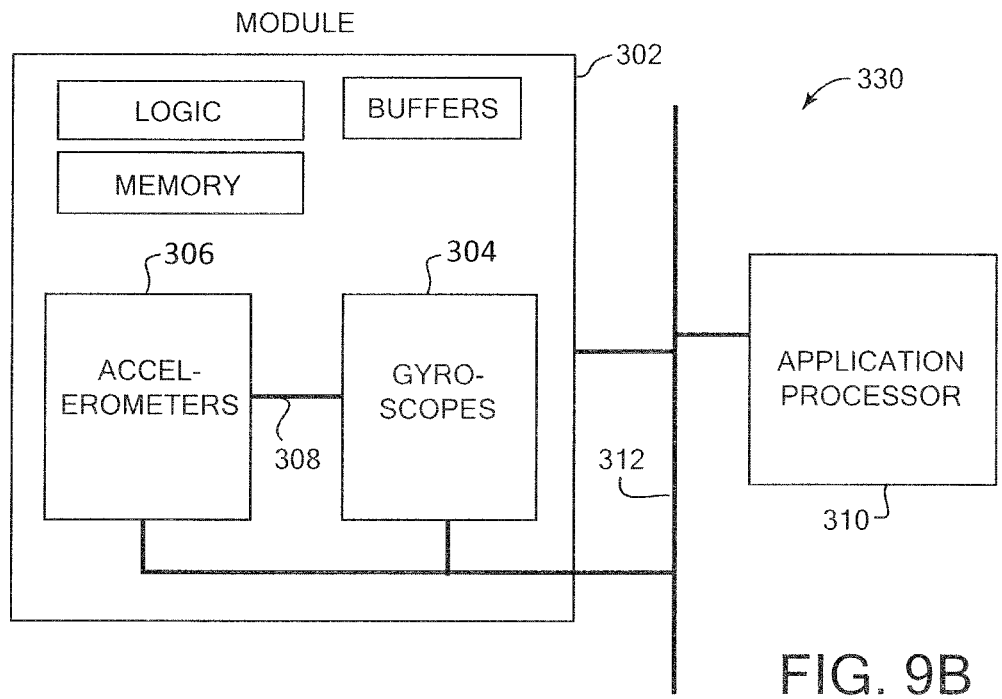

FIG. 9B illustrates another implementation 330, in which one or more of the subsystems included in the module (such as subsystems 304 and 306) are directly connected to one or more main external device buses 312. In this implementation, the sub-module data bus 308 may be isolated from the external device buses 312 as shown (but possibly capable of communicating with an external device bus via a subsystem connected to such external device bus). Alternatively, the sub-module data bus 308 may be directly connected to one or more external device buses.

Figure 9C:
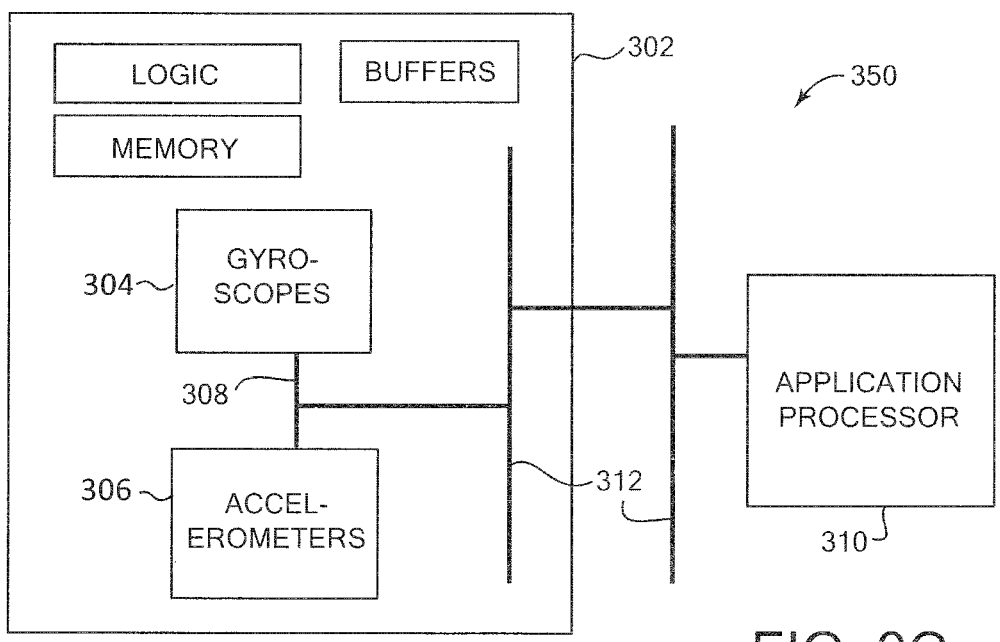

FIG. 9C illustrates another implementation 350, in which the sub-module data bus 308 is connected to one or more external device buses 312, while none of the subsystems included in the module (such as subsystems 304 and 306) are directly connected to any external device buses or other external devices. In this case, for example, the subsystems could communicate with external devices (such as application processor 310) via the sub-module data bus 308 and external device buses 312.

In one embodiment, one or more of the subsystems included in the module have the ability to pass data directly to the external bus from some or all of the motion sensors, possibly with no synchronization, no buffering, or no other motion data pre-processing.

In an embodiment, the handheld device includes a subsystem which, based on motion data derived from at least one of the motion sensors, is capable of facilitating interaction with the device. The subsystem may include logic for interpreting motion data that is received from the set of motion sensors, and could be implemented in hardware, software, firmware, or a combination of the foregoing. The subsystem may receive motion data from one, all, or any subset of the motion sensors at any particular time. The subsystem is then capable of facilitating interaction with the device by interpreting motion data and transposing it into commands or other input that could be understood by software, hardware or other logic integrated in the device.

Examples of interactions with the device based on motion data produced by motion sensors are provided throughout this patent in connection with various embodiments, including, for example, movement of a visual indicator on the screen in response to movement of the device, selection of visual elements in response to movement of the device, activation of applications or other features of the device in response to movement of the device, and so on. The received motion data can be processed using one or more of various processing techniques, and interpreted and/or prepared for or prepared to be acted upon other components of the handheld device. For example, copending U.S. patent application Ser. Nos. 11/774,488, 12/106,921, and 12/252,322, incorporated herein by reference in their entireties, describe various techniques and systems for processing and/or providing augmented sensor data, interpreting data and recognizing gestures or commands in the sensor data, and providing prepared data to an operating system, application, application processor or other component or software of the device, any or all of which can be used in the embodiments disclosed herein where applicable.

In one embodiment, the interaction with the device includes movement of a visual indicator, selection of a visual element, or movement of a visual element along a path on the display in response to rotation of the device along at least two of the following: a roll, pitch or yaw axis. In this embodiment, the path on the display could be a linear direction (in any orientation on the display, whether horizontal, vertical, diagonal or otherwise), a curved direction (including any circular, parabolic, ellipsoid or other curved line), a segmented direction (which may include any combination of linear directions and curved directions), a freeform direction, or any combination of the foregoing. In a three dimensional display, image, object or set of visual elements, the directions described above could be parallel with the display (i.e., in the plane of a conventional 2D display), vertical with respect to the surface of the display (i.e., in or out of the plane of a conventional 2D display), or oblique with respect to the plane of a conventional 2D display (i.e., in or out of the plane of a convention 2D display, at an arbitrary angle with the plane).

In one embodiment, the interaction with the device includes rotation of a visual element on the display in two or three dimensions in response to rotation of the device along at least one of a roll, pitch or yaw axis.

In one embodiment, the handheld device includes a motion function trigger which can be used to augment the operation of a subsystem capable of facilitating interaction with the device. In one implementation, when a user activates or deactivates the motion function trigger, the motion function trigger produces a signal which alters the state, context or operation of the subsystem capable of facilitating interaction with the device (e.g., activating or deactivating a particular function on the device, activating or deactivating some or all of the subsystem capable of facilitating interaction with the device).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art.

What is claimed is:

1. A handheld electronic device, the device comprising:
a subsystem providing display capability;
a set of motion sensors provided on a single sensor wafer substrate, the set of motion sensors for sensing rotational rate around at least three axes and linear acceleration along at least three axes, wherein the motion sensors sensing rotational rate are gyroscopes and the motion sensors sensing linear acceleration are accelerometers;
memory for storing sensor data derived from the gyroscopes and the accelerometers; and
a computation unit capable of determining motion data from the sensor data stored in the memory, wherein the memory and the computation unit are provided on an electronics wafer positioned vertically with respect to the sensor wafer substrate and substantially parallel to the sensor wafer substrate, the motion derived from a combination of the sensed rotational rate around at least one of the three axes and the sensed gravity and linear accelerator along at least one of the three axes, the electronics wafer being vertically bonded to and electrically connected to the sensor wafer substrate.

2. The electronic device of claim 1, wherein the motion sensors sensing rotational rate are implemented based on one or more of the following technologies: Micro Electro Mechanical Systems, piezoelectric, hemispherical resonator, tuning fork, quartz, carbon nanotubes.

3. The electronic device of claim 1, wherein the subsystem providing display capability consists of one of the following:
- a display attached to the device;
- a set of modules capable of producing an image substantially adapted for display on an external display; or
- a set of modules capable of projecting an image.

4. The electronic device of claim 1, wherein the subsystem providing display capability includes a display attached to the device, and wherein the interaction with the device includes movement of a visual indicator on the display.

5. The electronic device of claim 1, wherein the subsystem providing display capability includes a display attached to the device, and wherein the interaction with the device includes interaction with a visual element displayed on the screen.

6. The electronic device of claim 1, wherein the interaction with the device includes interaction with an application.

7. The electronic device of claim 1, wherein the subsystem providing display capability includes a display attached to the device, and wherein the interaction with the device consists of one or more of the following:
- movement of a cursor on the display in response to movement of the device;
- selection of a menu in response to movement of the device;
- activation of a menu in response to movement of the device;
- selection of an item included in a menu in response to movement of the device;
- activation of an item included in a menu in response to movement of the device;
- selection of an element shown on the display in response to movement of the device;
- activation of an element shown on the display in response to movement of the device;
- starting an application through an application-related element shown on the display in response to movement of the device;
- switching between at least two applications in response to movement of the device;
- interaction with an application through an application-related interface shown on the display in response to movement of the device; or
- exiting an application in response to movement of the device.

8. The electronic device of claim 1, wherein the subsystem providing display capability includes a display attached to the device, and wherein the interaction with the device consists of one or more of the following:
- movement of a visual indicator on the screen in a substantially-linear direction in response to rotational movement of the electronic device about one of the following: a roll, pitch or yaw axis of the electronic device;
- selection of a visual element on the screen in a substantially-linear direction in response to rotational movement of the electronic device about one of the following: a roll, pitch or yaw axis of the electronic device;
- movement of a visual element on the screen in a substantially-linear direction in response to rotational movement of the electronic device about one of the following: a roll, pitch or yaw axis of the electronic device;
- movement of a visual indicator on the screen along a segmented, freeform or curved path in response to rotation of the device along at least two of the following: a roll, pitch or yaw axis of the electronic device;
- selection of a visual element on the screen along a segmented, freeform or curved path in response to rotation of the device along at least two of the following: a roll, pitch or yaw axis of the electronic device; or
- movement of a visual element on the screen along a segmented, freeform or curved path in response to rotation of the device along at least two of the following: a roll, pitch or yaw axis of the electronic device.

9. The electronic device of claim 1, wherein the subsystem providing display capability includes a display attached to the device, and wherein the interaction with the device includes rotation of a visual element on the display in two or three dimensions in response to rotation of the device along at least one of a roll, pitch or yaw axis.

10. The electronic device of claim 1, wherein the subsystem providing display capability includes a display attached to the device, and wherein the interaction with the device consists of one or more of the following:
- panning an image on the display in response to movement of the device;
- zooming an image on the display in response to movement of the device;
- zooming a camera application running at least partially on the device in response to movement of the device;
- changing a page on the display in response to movement of the device;
- adjusting the location of at least one element on the display in response to movement of the device, wherein the at least one element is part of an array;
- navigating to a menu screen in response to movement of the device;
- selecting a key on a keypad displayed on the display in response to movement of the device;
- selecting a key on a telephone dial pad displayed on the display in response to movement of the device;
- selecting a character corresponding to the identify of a contact in response to movement of the device;
- initiating a telephone call in response to movement of the device;
- terminating a telephone call in response to movement of the device;
- recognizing a character in response to movement of the device;
- recognizing a plurality of characters in response to movement of the device;
- displaying an element on the display as part of an auto-complete operation in response to movement of the device;
- rotating a map on the display in response to movement of the device;
- zooming a map on the display in response to movement of the device;
- panning a map on the display in response to movement of the device;
- tilting a map on the display in response to movement of the device;
- scrolling through a set of elements, wherein at least one element included in the set of elements is displayed on the display, in response to movement of the device;
- interpreting a movement of the device depending on a context of the device;
- switching orientation of an image on the display between portrait and landscape modes in response to movement of the device;

activating an application in response to movement of the device, where the movement corresponds to switching between two different orientations;

providing visual, audio or vibration feedback in connection with interpretation of a movement of the device;

authenticating a user based on movement of the device;

transposing movement of the device into a tangible authentication mark;

controlling an external system based on movement of the device;

authorizing a commercial transaction based on movement of the device;

measuring caloric expenditure of a user based on movement of the device;

assessing a sports-related motion based on movement of the device;

counting a sports-related motion based on movement of the device;

assessing a game-related motion based on movement of the device;

controlling a power-saving feature of the device based on at least one of the following: orientation of the device, movement of the device, or absence of movement of the device; or recognizing an instruction to be transmitted to an external system based on movement of the device.

11. The electronic device of claim 1, wherein the subsystem providing display capability includes a display attached to the device, and wherein the interaction with the device consists of one or more of the following:

triggering a function in response to a set of taps applied to the device;

displaying a symbol in response to a set of taps applied to the device to provide visual feedback relating to the tap;

triggering a function of the device in response to a set of shakes applied to the device; or displaying a symbol in response to a set of shakes applied to the device to provide visual feedback relating to the tap.

12. The electronic device of claim 5, wherein the interaction with the visual element consists of one or more of the following: selecting the element, highlighting the element, opening the element, moving the element, reordering the element in a list of elements, or starting an application associated with the element.

* * * * *

UNITED STATES PATENT AND TRADEMARK OFFICE
CERTIFICATE OF CORRECTION

| | | |
|---|---|---|
| PATENT NO. | : 8,462,109 B2 | Page 1 of 1 |
| APPLICATION NO. | : 12/485823 | |
| DATED | : June 11, 2013 | |
| INVENTOR(S) | : Steven S. Nasiri and David Sachs | |

It is certified that error appears in the above-identified patent and that said Letters Patent is hereby corrected as shown below:

Title Page
Item (63), Related U.S. Application Data
Change "12/026,493, filed on Feb. 5, 2008, now Pat. No. 7,827,502" to read --12/026,490, filed on Feb. 5, 2008, now Pat. No. 8,020,441--.

In the Specification
Column 1, line 29, the text "12/026,493" should be changed to --12/026,490--.

Signed and Sealed this
Thirteenth Day of August, 2013

Teresa Stanek Rea
*Acting Director of the United States Patent and Trademark Office*